(12) United States Patent
Fraser et al.

(10) Patent No.: US 10,076,099 B2
(45) Date of Patent: *Sep. 18, 2018

(54) PREDATION DETECTION ANIMAL TRACKING TAG

(71) Applicant: InnovaSea Marine Systems Canada Inc., Bedford (CA)

(72) Inventors: Terrance William Fraser, Halifax (CA); Gary Donald Marsh, Boutiliers Point (CA); Chad Douglas Murphy, Porters Lake (CA); Douglas Bruce Oakley, Dartmouth (CA); Timothy Bruce Stone, Enfield (CA); Dale Mitchell Webber, Lake Fletcher (CA); Ryan Isaac Fielden, Dartmouth (CA); Kimberly Jean Miller, Halifax (CA); Mary Anne White, Halifax (CA); Aubrey Johannes Ingraham, Chester Basin (CA); Philip Ronald Huntley, Head of St. Margaret's Bay (CA)

(73) Assignee: InnovaSea Marine Systems Canada Inc., Bedford, Nova Scotia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/527,359

(22) PCT Filed: Nov. 17, 2015

(86) PCT No.: PCT/CA2015/051194
§ 371 (c)(1),
(2) Date: May 17, 2017

(87) PCT Pub. No.: WO2016/077917
PCT Pub. Date: May 26, 2016

(65) Prior Publication Data
US 2017/0354121 A1 Dec. 14, 2017

(30) Foreign Application Priority Data

Nov. 19, 2014 (CA) .................................... 2871837
Mar. 3, 2015 (WO) ................ PCT/CA2015/050160
Sep. 4, 2015 (CA) .................................... 2903243

(51) Int. Cl.
*A01K 11/00* (2006.01)
*A01K 29/00* (2006.01)

(52) U.S. Cl.
CPC .......... *A01K 11/006* (2013.01); *A01K 29/005* (2013.01)

(58) Field of Classification Search
CPC .... A01K 11/00; A01K 11/001; A01K 11/005; A01K 11/006; A01K 29/00; A01K 29/005; A01K 61/95
See application file for complete search history.

(56) References Cited

U.S. PATENT DOCUMENTS 3,069,657 A   6/1958  Green, Jr. et al.
3,216,411 A   11/1965 Tetsu Watanuki et al.
(Continued)

FOREIGN PATENT DOCUMENTS

CA   2691783 A1   4/2010
CA   2814808 A1   7/2014
(Continued)

OTHER PUBLICATIONS

Virginia Afentoulis et al. Predation Detection Tag Efficacy, TFFIP Research Proposals, pp. 1-8. Published Fall 2013 or before Mar. 7, 2014.
(Continued)

*Primary Examiner* — Van Trieu
(74) *Attorney, Agent, or Firm* — Harris Beach PLLC; Neal L. Slifkin

(57) ABSTRACT

A magnetic tracking tag for animals may detect the occurrence of a predation event. The tag may include a pH
(Continued)

sensitive material that degrades in the environment of a predator's gut. The degradation of the pH sensitive material causes a change in a detectable magnetic field of the tag, which allows the tag to detect the predation event and adjust its operation accordingly.

60 Claims, 27 Drawing Sheets

(56) References Cited

U.S. PATENT DOCUMENTS

| | | | |
|---|---|---|---|
| 3,742,535 A | 7/1973 | Horrer et al. | |
| 3,848,226 A | 11/1974 | Perez | |
| 4,065,753 A | 12/1977 | Paul, Jr. | |
| 4,430,552 A | 2/1984 | Peterson | |
| 4,461,241 A | 7/1984 | Ostler | |
| 4,854,328 A | 8/1989 | Pollack | |
| 4,992,776 A | 2/1991 | Crossfield | |
| 5,022,013 A | 6/1991 | Dalton et al. | |
| 5,348,501 A | 9/1994 | Brown | |
| 5,483,767 A | 1/1996 | Langer | |
| 5,581,930 A | 12/1996 | Langer | |
| 5,634,432 A | 6/1997 | O'Grady et al. | |
| 5,701,276 A | 12/1997 | Bellini | |
| 6,271,767 B1 | 8/2001 | Frye et al. | |
| 6,286,460 B1 | 9/2001 | Gudbjornsson | |
| 6,304,182 B1 | 10/2001 | Mori et al. | |
| 6,519,206 B1 | 2/2003 | Martin et al. | |
| 6,846,994 B2* | 1/2005 | Wenner | A61B 1/00036 200/61.04 |
| 6,960,984 B1 | 11/2005 | Vicci et al. | |
| 7,187,623 B2 | 3/2007 | Green et al. | |
| 7,487,614 B1 | 2/2009 | Walker et al. | |
| 9,095,122 B2 | 8/2015 | Allen et al. | |
| 9,526,228 B2* | 12/2016 | Fraser | A01K 11/006 |
| 2002/0010390 A1 | 1/2002 | Guice et al. | |
| 2004/0000998 A1 | 1/2004 | Karp | |
| 2004/0250460 A1 | 12/2004 | Scott | |
| 2005/0228268 A1 | 10/2005 | Cole | |
| 2007/0078113 A1 | 4/2007 | Roth et al. | |
| 2007/0123772 A1 | 5/2007 | Euliano et al. | |
| 2008/0112885 A1 | 5/2008 | Okunev et al. | |
| 2008/0146871 A1 | 6/2008 | Arneson et al. | |
| 2008/0171725 A1 | 7/2008 | Roth et al. | |
| 2008/0171726 A1 | 7/2008 | Roth et al. | |
| 2008/0180242 A1 | 7/2008 | Cottingham | |
| 2009/0261975 A1 | 10/2009 | Ferguson et al. | |
| 2010/0039690 A1 | 2/2010 | Agrawal et al. | |
| 2010/0215732 A1 | 8/2010 | Mintchev | |
| 2010/0261038 A1* | 10/2010 | Imaoka | B22F 1/02 428/800 |
| 2011/0096388 A1 | 4/2011 | Agrawal et al. | |
| 2012/0040024 A1 | 2/2012 | Roth et al. | |
| 2012/0092132 A1 | 4/2012 | Holme et al. | |
| 2012/0134239 A1 | 5/2012 | Struthers | |
| 2013/0021877 A1 | 1/2013 | Gotz et al. | |
| 2013/0127523 A1 | 5/2013 | Vereb et al. | |
| 2013/0143041 A1 | 6/2013 | Mathias et al. | |
| 2014/0062667 A1 | 3/2014 | Ferguson et al. | |
| 2014/0178365 A1 | 6/2014 | Ghaderi et al. | |
| 2014/0211594 A1 | 7/2014 | Allen | |
| 2014/0367341 A1* | 12/2014 | Sasaki | C02F 1/5236 210/695 |
| 2015/0063072 A1 | 3/2015 | Deng et al. | |
| 2015/0250140 A1 | 9/2015 | Fraser et al. | |
| 2015/0289479 A1 | 10/2015 | Allen | |
| 2016/0332916 A1* | 11/2016 | Ancia | B03C 1/002 |
| 2017/0118952 A1* | 5/2017 | Fraser | A01K 11/006 |

FOREIGN PATENT DOCUMENTS

| | | |
|---|---|---|
| CA | 299360 A1 | 3/2015 |
| CA | 2845230 A1 | 9/2015 |
| CA | 2871837 A1 | 9/2015 |
| CA | 2903243 A1 | 5/2016 |
| CN | 101559202 A | 10/2009 |
| CN | 101599202 A | 10/2009 |
| CN | 1032497792 A | 8/2013 |
| EP | 1 204 311 | 5/2002 |
| EP | 1 885 343 | 2/2008 |
| WO | 9845169 | 10/1998 |
| WO | 0113712 A1 | 3/2001 |
| WO | 2006127355 A2 | 11/2006 |
| WO | 2006127355 A3 | 11/2006 |
| WO | 2014028084 A2 | 2/2014 |
| WO | 2014028084 A3 | 2/2014 |
| WO | 2015131279 A1 | 9/2015 |
| WO | 2016077917 A1 | 5/2016 |

OTHER PUBLICATIONS

Quick Course in Underwater Telemetry Systems (Jan. 2002); D.G. Pincock and F.A. Voegeli; © VEMCO Limited, 1990,1992,2001, 2002.

V5 and V6 Coded Transmitters (180Hz), V5 and V6 Coded Transmitters Datasheet (4977-01), pp. 1-2. © 2012 AMIRIX Systems Inc.

V9AP Coded Transmitter, V9AP Coded Transmitter Datasheet (4706-06) pp. 1-3, © 2012 AMIRIX Systems Inc.

V13 Coded Transmitter, V13 Coded Transmitter Datasheet (4458-07) pp. 1-2, © 2012 AMIRIX Systems Inc.

VEMCO Acoustic Telemetry New User Guide, Dr. Dale Webber, VEMCO DOC-004934-01, © (2009) AMIRX Systems Inc.

VR2W Single Channel Receiver, R2W Single Channel Receiver Datasheet (4395-04) pp. 1-2, © 2012 AMIRIX Inc. Systems.

Introducing the VEMCO VR2W Positioning System (VPS), Introducing the VEMCO VR2W Positioning System (VPS) Datasheet (4722-02), pp. 1-2, © 2008 AMIRIX Systems Inc.

"Applications of Chitosan and Chitosan Derivatives in Drug Delivery," Vipin Bansal et al, Advances in Biological Research 5 (1): 28-27, 2011. ISSN 1992-0067 © IDOSI Publications, 2011.

Chitin and Chitosan: Properties and Applications, Marguerite Rinaudo, Science Direct, Prog. Polym. Sci. 31 (2006) 603-632. www.sciencedirect.com.

"Influence of the Chemical Structure and Physicochemical Properties of Chitin- and Chitosan-Based Materials on Their Biomedical Activity," Jolanta Kumirska et al., Chapter 2 of: Biomedical Engineering, Trends in Materials Science, Ed. Anthony N. Laskovski, Pub. Intech (Online) Jan. 8, 2011. ISBN 978-953-307-513-6.

Cooke et al. Tracking animals in freshwater with electronic tags: past, present and future. Animal Biotelemetry, vol. 1, No. 2, May 1, 2013, [online], [retrieved on Dec. 30, 2015]Retrieved URL: http://animalbiotelemetry.biomedcentral.com/articles/10.1186/2050-3385-1-5.

Nielson et al. Tagging and Tracking of Marine Animals with Electronic Devices. London: Springer, 2009 ISBN 978-1-4020-9639-6, p. 17.

Kirby 'On the Integrated Study of Tuna Behaviour and Spacial Dynamics: Tagging and Modelling as Complementary Tools'. In:'Electronic Tagging and Tracking in Marine Fisheries', Proceedings of the Symposium on Tagging and Tracking Marine Fish with Electronic Devices, Edited by Sibert at al. East-West Center, University of Hawaii:, Springer, Feb. 7-11, 2000, ISBN 978-94-017-1402-0, pp. 407-420, especially p. 417.

Notification of Transmittal of the International Search Report and Written Opinion of the International Searching Authority, PCT/CA2015/050160, dated Jun. 9, 2015, pp. 1-14.

Antimicrobial and Physical Properties of Chitosan Film as Affected by Solvent Types and Glycerol as Plasticizer, Syarifah Nur Adila et al, Trans Tech Publications (ID: 216. 33.62.90, Infotrieve, Inc.—Apr. 27, 2015, 16:22:14).

Influence of Gelatin/Chitosan Wound Dressing on Shrinkage of Newly Incised Wounds, Huang Zhi-lin et al, Chinese Journal of Clinical Rehabilitation, Aug. 14, 2005, vol. 9, No. 30.

Preparation of Chitosan-Based Adhesives and Assessment of Their Mechanical Properties, Anil K. Patel et al., Journal of Applied Polymer Science, Published May 23, 2012.

(56) References Cited

OTHER PUBLICATIONS

Probability of Detecting Marine Predator-Prey and Species Interactions Using Novel Hybrid Acoustic Transmitter-Receiver Tags, Laurie L. Baker et al., PLOS One, Jun. 2014, vol. 9, Issue 6, e98117.
Nous Vous Remercions de Votre Commande Aupres d'Infotrieve, Cui, Zheng et at., Green Chemistry Letters and Reviews, 4/1: 35-40 Mar. 2011.
Solid-State and Mechanical Properties of Aqueous Chitosan-Amylose Starch Films Plasticized With Polyols, Mirna Fernandez Cervera et al., AAPS PharmaSciTech 2004; 5(1) Article 15 (http://www.aapspharmscitech.org).
Ultrasonic Telemetry: Its Application to Coral Reef Fisheries Research, Dirk C. Zeller, Fish. Bull. 97 (4): 1058-1065 (1999).
PCT: International Search Report, dated Feb. 2, 2016 (Feb. 2, 2016), 6 pages.
Communication: The Extended European Search Report for Application No. 15757872.5, dated Sep. 20, 2017, pp. 1-7. Applicant: AMIRIX Systems, Inc.
Robert D. Moore et al. An Ocean Bottom, Microprocessor Based Seismometer; Geological Research Division, Scripps Institution of Oceanography, University of California, San Diego, La Jolla, CA, 92093, U.S.A. pp. 1-27. (Accepted Oct. 21, 1980). Marine Geophysical Researches 4 (1981) 451-477. 0025-3235/81/0044-0451. Copyright 1981 by D. Reidel Publishing Company, Dordrecht, Holland.
CN Office Action dated Dec. 20, 2017 for 201580012483.X. 5 Pages.

\* cited by examiner

PREDATION DETECTION ANIMAL TRACKING TAG

FIELD OF THE INVENTION

The current description relates to a tracking tag for animals, and in particular to a tracking tag capable of detecting a predation event.

BACKGROUND

Fish or other marine animals may be tagged with tracking devices in order to track their movement. The tracking tags transmit ultrasonic pulses that can be detected at one or more receivers deployed at various locations in a body of water under study.

The tags used for tracking marine animals are often implanted within the coelomic cavity of the animal being tracked. Typically, tracking tags periodically transmit ultrasonic pulses to communicate a unique identifier of the tag that allows individual animals to be tracked. Additionally, the tracking tags may also communicate other data collected by the tag, such as temperature and acceleration information. Once the tracking tags are activated, they typically will continue to transmit until a battery dies.

When a tagged marine animal is eaten by a predator, the tracking tag often will continue to operate within the predator's body. Researchers have been unable to determine if the tracking tag was operating in a tagged animal or within a predator.

An additional, alternative and/or improved tracking tag for marine animals is desirable.

SUMMARY

In accordance with the present disclosure there is provided a tag for tracking an animal comprising: a first magnet at least partially encased in a pH sensitive material exposed to an external environment of the tag, the pH sensitive material degrading in the presence of an acidic environment; a sensor for detecting a magnetic field; a magnetic attractor providing a force to induce a change in the magnetic field detectable by the sensor upon release of the first magnet as a result of at least partial degradation of the pH sensitive material; and circuitry for providing a predation event trigger based upon the change in the magnetic field detectable by the sensor.

In a further embodiment of the tag, the magnetic attractor comprises a second magnet.

In a further embodiment of the tag, the second magnet is permanently affixed to the tag.

In a further embodiment of the tag, the second magnet causes the first magnet to move relative to the sensor when the pH sensitive material is sufficiently degraded to release the first magnet.

In a further embodiment of the tag, the second magnet is arranged with its magnetic field perpendicular to the magnetic field of the first magnet when the first magnet is at least partially encased in a pH sensitive material, and the second magnet causes the first magnet to rotate when the pH sensitive material is sufficiently degraded to release the first magnet.

In a further embodiment of the tag, the sensor is capable of detecting an orientation of a magnetic field, a change in the orientation of the magnetic field, a magnitude of the magnetic field, a change in the magnitude of the magnetic field or a combination thereof.

In a further embodiment of the tag, the second magnet is arranged with its magnetic field perpendicular to a particular axis of the sensor.

In a further embodiment of the tag, the sensor is sensitive to the magnetic field of the first magnet when it is oriented parallel with the particular axis of the sensor, and insensitive to the magnetic field of the first magnet that is oriented perpendicular to the particular axis of the sensor.

In a further embodiment of the tag, the second magnet attracts the first magnet out of a detection range of the sensor when the pH sensitive material is sufficiently degraded to release the first magnet.

In a further embodiment of the tag, the first magnet and the second magnet are secured or located against or adjacent to each other by the pH sensitive material with their respective magnetic fields aligned such that their respective magnetic fields add together constructively, wherein the first magnet and the second magnet tend to rotate or move relative to each other when released from the pH sensitive material such that their respective magnetic fields add destructively when moved or rotated.

In a further embodiment of the tag, the sensor is capable of detecting a strength of the magnetic fields or a change in the strength of the magnetic fields.

In a further embodiment of the tag, the magnetic attractor comprises an un-magnetized ferromagnetic material permanently affixed to the tag.

In a further embodiment of the tag, the magnetic attractor attracts the first magnet out of a detection range of the sensor when the pH sensitive material is sufficiently degraded to release the first magnet.

In a further embodiment of the tag, the first magnet comprises a degradable magnet.

In a further embodiment of the tag, the degradable magnet comprises particles of ferromagnetic material bonded together by the pH sensitive material, the particles of the ferromagnetic material being magnetized subsequent to bonding together to impart a net magnetic field to the degradable magnet.

In a further embodiment of the tag, the degradable magnet releases the magnetized particles of magnetic material when the pH sensitive material is degraded resulting in a reduced net magnetic field.

In a further embodiment of the tag, the acidic environment is a gut of a predator animal.

In a further embodiment of the tag, the pH sensitive material does not degrade substantially in a neutral or basic environment.

In a further embodiment of the tag, the neutral or basic environment is a coelomic cavity of the animal.

In a further embodiment of the tag, the first magnet is affixed to the tag by using the pH sensitive material as an adhesive to affix the first magnet to the tag.

In a further embodiment of the tag, the first magnet is at least partially encased in the pH sensitive material to form a plug that is affixed to the tag using an adhesive.

In a further embodiment of the tag, the first magnet is at least partially encased in the pH sensitive material to form a plug that is mechanically retained by at least a portion of a body of the tag.

In a further embodiment of the tag, the pH sensitive material comprises a chitosan.

In a further embodiment of the tag, the pH sensitive material is cast from a slurry of the chitosan and a solvent.

In a further embodiment of the tag, the solvent is selected from: L-ascorbic acid; citric acid; acetic acid; and hydrochloric acid.

In a further embodiment of the tag, the solvent is citric acid.

In a further embodiment of the tag, the solvent is acetic acid.

In a further embodiment of the tag, the pH sensitive material comprises a film having a thickness of at least 0.05 mm.

In a further embodiment of the tag, the pH sensitive material comprises a film having a thickness of at least 0.20 mm.

In a further embodiment of the tag, the pH sensitive material comprises a plasticizing agent.

In a further embodiment of the tag, the plasticizing agent is selected from: glycerol; ethylene glycol; poly ethylene glycol; erythritol; oleic acid; propylene glycol; di-hydroxyl stearic acid; and sorbitol.

In a further embodiment of the tag, the plasticizing agent is glycerol.

In a further embodiment of the tag, the pH sensitive material is treated with a cross-linking agent.

In a further embodiment of the tag, the cross-linking agent is selected from: sodium citrate; sodium sulfate; and calcium chloride.

In a further embodiment of the tag, the pH sensitive material comprises a filler material to control shrinkage of the pH sensitive material.

In a further embodiment of the tag, the filler material comprises microspheres.

In a further embodiment of the tag, the microspheres comprise glass microspheres.

In a further embodiment of the tag, the filler material is present in an amount of between 50% and 150% by volume of the pH sensitive material prior to drying.

In a further embodiment of the tag, the amount of filler material present is between 83% and 111% by volume of the pH sensitive material prior to drying.

In a further embodiment, the tag comprises a microprocessor for controlling one or more functions of the tag based upon the predation event trigger.

In a further embodiment of the tag, the circuitry for providing the predation event trigger is provided by the microprocessor.

In a further embodiment of the tag, the microprocessor operates in at least one of a first mode or a second mode based on the predation event trigger.

In a further embodiment of the tag, the microprocessor switches from operating in the first mode to operating in the second mode based on the predation event trigger.

In a further embodiment of the tag, the microprocessor logs information related to the predation event trigger.

In a further embodiment of the tag, the microprocessor logs information to non-volatile memory of the tag.

In a further embodiment of the tag, the microprocessor maintains a measure of elapsed time since the predation event trigger, and wherein the logged information comprises the elapsed time since the predation event trigger event.

In a further embodiment, the tag comprises a transmitter for transmitting information related to the predation event trigger.

In a further embodiment of the tag, the transmitter comprises an acoustic transducer.

In a further embodiment of the tag, the transmitter comprises a radio frequency (RF) transmitter.

In a further embodiment of the tag, the RF transmitter comprises an active RF transmitter.

In a further embodiment of the tag, the RF transmitter comprises a passive RF transmitter.

In a further embodiment of the tag, the passive RF transmitter comprises an RFID transmitter.

In a further embodiment of the tag, the microprocessor maintains a measure of elapsed time since the predation event trigger, and wherein the transmitted information comprises the elapsed time since the predation event trigger event.

In a further embodiment of the tag, the measure of elapsed time transmitted by the transmitter is encoded in non-linear fashion.

In a further embodiment of the tag, the microprocessor operates in at least a configuration mode for transferring data to the tag to configure operation of the microprocessor.

In a further embodiment of the tag, a varying magnetic field is used for transferring data to the tag when the microprocessor is in the configuration mode.

In a further embodiment of the tag, the microprocessor further operates in at least a calibration mode for determining a value for a compensation magnetic field to allow detecting of the varying magnetic field used for transferring data in the presence of a constant magnetic field of at least the first magnet.

In a further embodiment of the tag, the microprocessor calculates the value for the compensation magnetic field and transmits the calculated value for the compensation magnetic field to an activation device.

In a further embodiment of the tag, the tag transmits an indication of a detected magnetic field in order to allow an activation device to calculate the value for the compensation magnetic field.

In a further embodiment of the tag, the animal is an aquatic animal.

BRIEF DESCRIPTION OF THE DRAWINGS

Features, aspects and advantages of the present disclosure will become better understood with regard to the following description and accompanying drawings in which.

DETAILED DESCRIPTION

A tracking tag for tracking animals is described further herein. The tracking tag is capable of detecting if the animal being tracked has been eaten by a predator and adjusting its operation upon detection of the predation event. The tracking tag uses a magnet secured in place by a pH sensitive material that degrades in the presence of the acidic environment of a predator's gut. Once sufficiently degraded, the magnet moves and the resulting magnetic field, or the change in the magnetic field may be used as an indication that a predation event has occurred. The tag may include a component, such as an additional magnet or un-magnetized ferromagnetic material, that provides a biasing force to the magnet so that once the magnet is released from the degraded pH sensitive material the magnet will tend to move causing a detectable change in the magnetic field.

Figure 1:
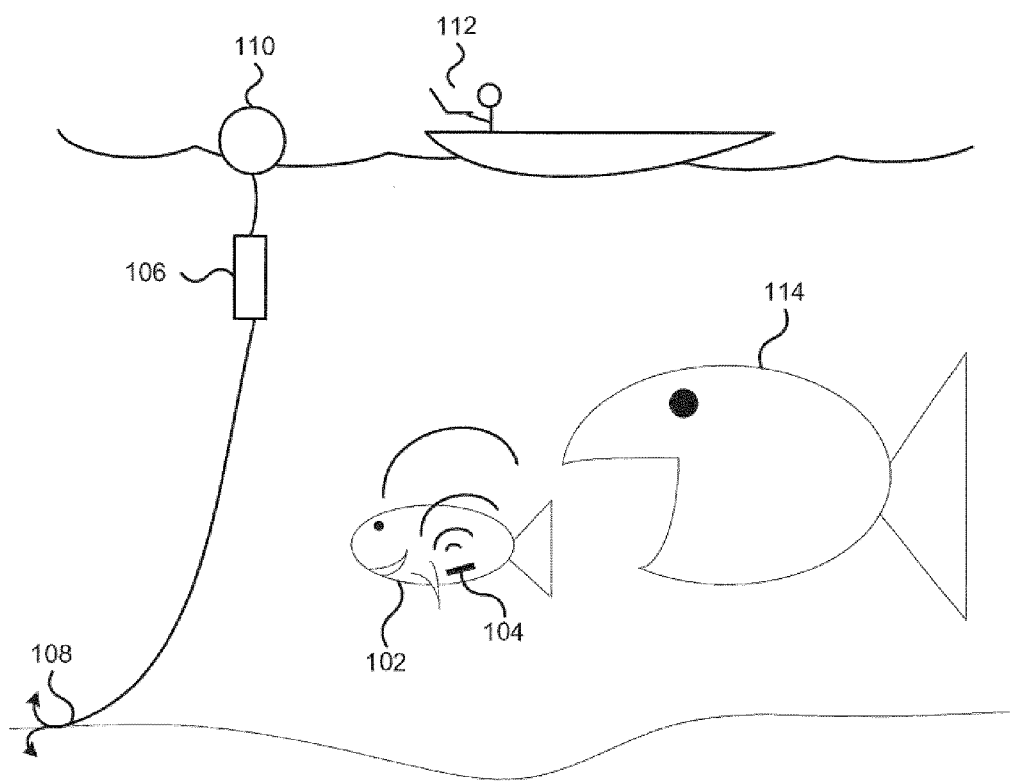
FIG. 1 depicts an environment in which tracking tags may be used.

FIG. 1 depicts an environment 100 in which tracking tags may be used. Although FIG. 1 depicts a predation tracking tag being used within an aquatic environment, the predation tracking tag may be used in other non-aquatic environments. A fish 102 is tagged with a tracking device 104, referred to as a tracking tag, or simply a tag. Tracking tags may be implanted within the coelomic cavity of the animal. Additionally or alternatively, the tracking tag may be externally attached to the animal, for example by adhering or affixing to an animal's coat or fin. The tag 104 periodically emits ultrasonic pulses that are received by one or more receivers 106 that are located within the body of water or area being studied. The receivers may be anchored 108 in place or may be suspended by a buoy 110, or any other suitable means of positioning the receiver at a desired location. The receiver 106 detects the ultrasonic pulses transmitted by tags. The detection events are recorded and stored by the receiver 106. The recorded events can be retrieved from each of the receivers. For example, the data can be periodically downloaded to a computer such as a laptop 112. Although depicted as being carried out while the receiver 106 remains in position, the data may also be retrieved from the receiver 106 by a physical connection to the receiver, which may require the receiver 106 to be retrieved. The length of time the receiver remains in place may vary depending upon the requirements of the study. Further, it is possible to track a tag in real time; however, this is typically performed by having a receiver located on a boat and following the marine animal being tracked as it moves about.

The tags may communicate data using various techniques. For example, the tags may continuously transmit signals, or may periodically transmit signals. The time interval at which the tags transmit signals may vary and may be adjustable. For example, a tag may transmit signals every 1 second, 5 seconds, 10 seconds, 15 seconds, 30 seconds 60 seconds, or at other intervals. In addition to varying when tags transmit information, the information that is transmitted may also be varied. For example, the tag may simply transmit a unique, or unique within a particular set of tags, identifier (ID). Receivers may detect the periodic transmission of the unique IDs and record the detection events, along with the time of the detection. The movement of the animal being tracked can be reconstructed from the various detection events with corresponding unique IDs. In addition to the unique ID, the tag may also transmit other information such as a sequence number that increases with each transmission, or other data that is tracked by the tag depending upon available sensors in the tag. For example, the tag may also indicate readings from a temperature sensor, acceleration sensors or other types of sensors as may be provided by the tag.

Tags may last for a varying period of time depending upon the operating characteristics of the tag as well as the power supply of the tag. Generally, a tag is activated prior to being attached to or implanted in the animal being tracked. Once the tag is activated it will typically continue to operate until it does not have sufficient power. If a marine animal being tracked, such as fish 102, is eaten by a predator such as fish 114, the tag may continue to operate and the movement of the predator may be incorrectly associated with the marine animal that was eaten.

Tags as described herein can detect a predation event and adjust their operation accordingly. When a tag detects that the marine animal has been eaten, the tag may stop transmitting further information, or may continue transmitting information but provide an indication that a predation event was detected, for example by transmitting a secondary ID of the tag. The secondary ID of the tag may include the original unique ID or be otherwise associated with the original ID so that the animal that was eaten can be determined. For example the first unique ID for tracking a tagged living animal may be 123A while the second unique ID of the tag used when a predation event has been detected may be 123B. In this example of the IDs it is assumed that the 123 portion of both IDs is unique with regard to other tags. The tag does not detect the predation event directly, but rather detects a change associated with the animal being eaten. The tag may use a pH sensitive material that degrades in the acidic environment of the gut of a predator. The degradation of the pH sensitive material can be detected by the tag and, as such, the tag can adjust its operation accordingly.

In addition to providing an indication that a predation event has occurred, for example by transmitting a different unique ID when a predation event occurs, the tag may transmit additional information associated with the predation event. For example, the tag may transmit a measure of elapsed time since the detection of a change in the characteristic of the tag, which change is associated with the predation event. The measure of elapsed time may be transmitted in the ultrasonic signal. The measure may increase with the passage of time through the operating life of the tag. The elapsed time measure may be encoded in a linear or non-linear fashion or format. Encoding the elapsed time in a non-linear fashion may provide better resolution during early stages following predation compared to late stages. For example, the measure may change in 15 minute increments in the short term after the predation event, but use one day increments late in its operating life, and possibly using various other increments in the interim as time passes. The time since the detection of a change in the characteristic of the tag may be tracked by the microcontroller or other appropriate components of the tag.

Although the tag 104 is described as communicating information, including information related to a predation event, to a receiver using ultrasonic pulses, it is possible for the predation tracking tag to control the tag operation in other ways in response to a detected predation event. For example, the tag could transmit the information using additional or alternative transmitters, such as radio frequency (RF) transmitters. Acoustic transmitters may be well suited for aquatic environments, however, it is possible for RF transmitters to be used in aquatic environments, although water characteristics, including for example salt content, may reduce a useful transmission range of the RF transmitter. Additionally, or alternatively, the tag could log, or store, the occurrence of the predation event in a tag memory for later retrieval upon retrieval of the predation tracking tag. It will be apparent that the predation tracking tags may perform different functions or operate in different modes when a predation event occurs.

Figure 2:
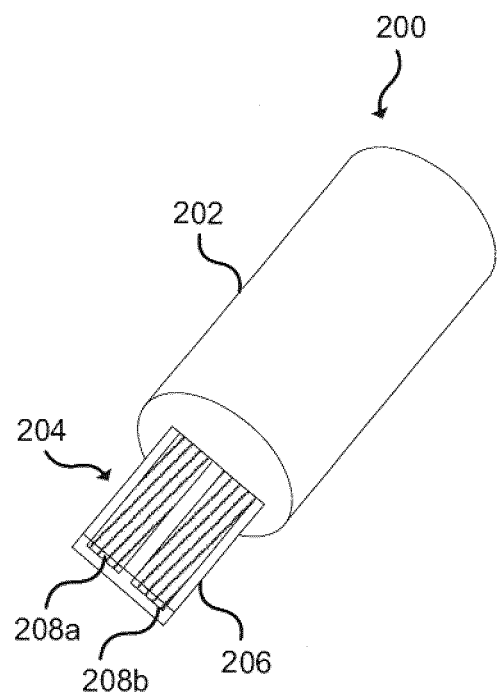
FIGS. 2A, 2B, 2C depict a predation tracking tag.
Figure 2:
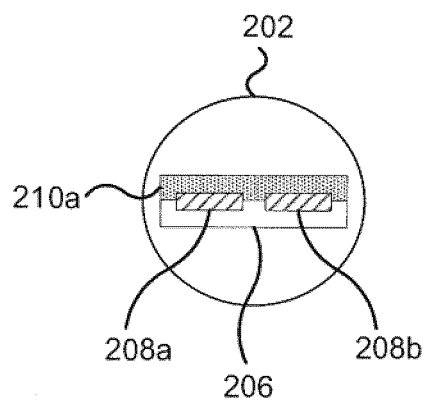
Figure 2:
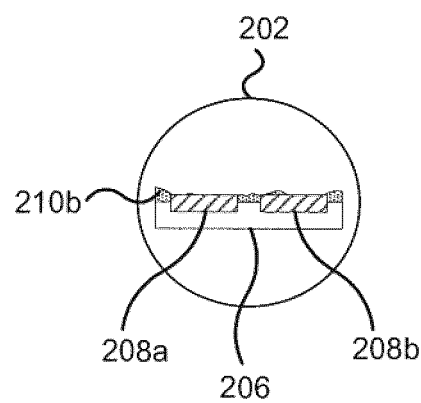

FIGS. 2A, 2B, 2C depict a predation tracking tag. The predation tracking tag 200 may be used to track a tagged animal. The tag 200 detects a predation event, i.e., the tagged animal being eaten by a predator. The tag 200 comprises a main body 202 that houses the main tag components. The tag 200 may vary in size from a few millimeters to a few centimeters or more depending upon the size of the animal being tracked. The tag 200 includes a sensor 204 that detects an electrical characteristic of the tag 200. The sensor 200 comprises a substrate 206 that provides support for two electrodes 208a, or 208b. The impedance or other electrical characteristics of the electrodes can be detected by a microcontroller of the tag.

A coating or film of a pH sensitive material 210a may be formed over the electrodes 208a, 208b as depicted in FIG. 2B. The pH sensitive material is selected to degrade, preferably quickly, in the acidic environment of a predator's gut, while resisting degradation in a neutral or basic environment, such as a coelomic cavity of an animal in which the tag has been implanted. As such, when the tag remains in the coelomic cavity of the animal being tracked, the pH sensitive material stays intact covering the electrodes 208a, 208b and as such a first value will be measured for the particular electrical characteristic being monitored, such as impedance or resistance.

If the tagged animal is eaten, the animal will be digested within the gut of the predator, and as such the tag 200 will be exposed to the acidic environment of the predator's gut. The acidic environment will degrade the pH sensitive material 210b covering the electrodes as depicted in FIG. 2C. As the pH sensitive material is degraded, the electrodes 208a, 208b will be exposed to the environment and the previously measured value of the electrical characteristic will change. The different value is detected and used by the tag to determine that a predation event has occurred. Once the tag, or more particularly a microcontroller of the tag, has determined that the predation event has occurred, the operation can be adjusted accordingly, for example by stopping further transmission, or by altering the transmitted ID of the tag used to indicate that the tag has detected a predation event. Additional, or alternative, actions such as logging information may occur upon detection of the predation event.

Various pH sensitive materials may be used, and a selection of possible pH sensitive materials are described further herein. The pH sensitive material should resist degradation when in the environment associated with a living animal being tracked. The pH sensitive material should resist degradation in such an environment for a relatively long period of time, such as the expected operating lifetime of the tag. Although the pH sensitive material should resist degradation within a normal operating environment, such as within a coelomic cavity, it should degrade, preferably quickly, within the acidic environment. For example, the pH sensitive material may degrade quickly enough to expose the electrodes within 60 to 120 minutes of a tagged animal being eaten by a predator. The composition of the pH sensitive material, as well as an amount of the pH sensitive material used to cover the electrodes, and so which must degrade to expose the electrodes, can be adjusted to meet the required characteristics. Further, the composition may include one or more additives that may affect the detection of the characteristic and, as such, facilitate the determination of whether or not the pH sensitive material is still intact or has substantially degraded. The pH sensitive material may be considered to have substantially degraded once it has degraded enough that a change in the characteristic can be detected in order to indicate the occurrence of the predation event.

Figure 3:
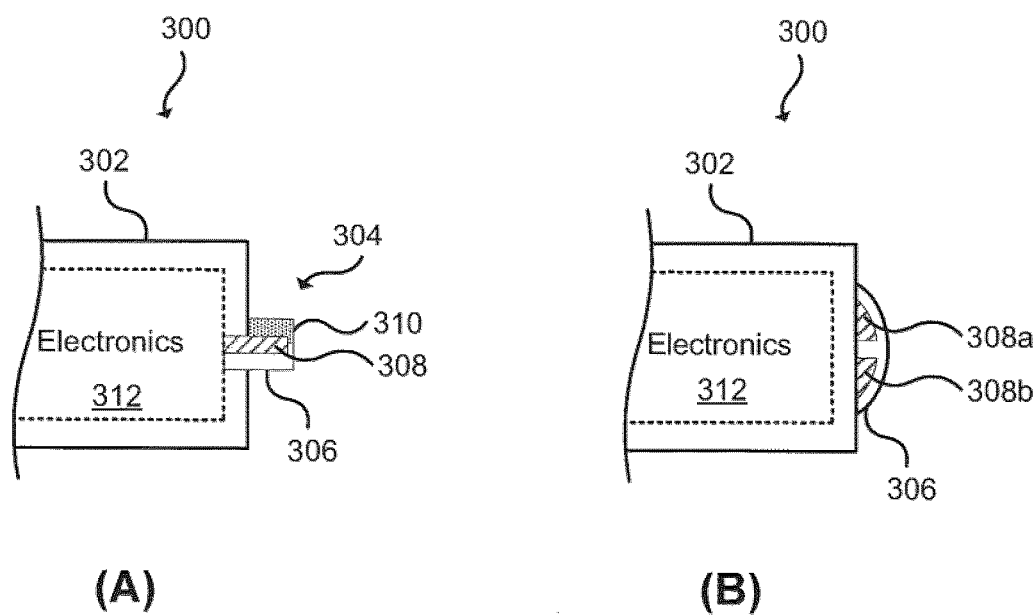
FIGS. 3A, 3B depict a further predation tracking tag.

FIGS. 3A, 3B depict further predation tracking tags. The tags depicted are similar to the tag 200 described above; however, the geometry of the electrodes differ. The predation tracking tag 300 comprises a body 302 and shortened and rounded predation sensor 304 coupled to the electronics 312 of the predation tracking tag 302. The predation sensor 304 comprises electrodes 308a, 308b on a substrate 306. The electrodes 308a, 308b are covered with a pH sensitive material 310 that degrades in the acidic environment of a predator's digestive tract. When an animal tagged with the predation tracking tag 302 is eaten by a predator, the pH sensitive material 310 dissolves in the digestive tract of the animal. Once the pH sensitive material 310 degrades, the electrodes 308a, 308b are exposed to the environment and the electronics 312 may detect a change in the electrical characteristics of the electrodes. The shortened and rounded geometry of the predation sensor 304 may be appropriate for insertion into the coelomic cavity due to its shortened length and lack of corners.

Figure 4:
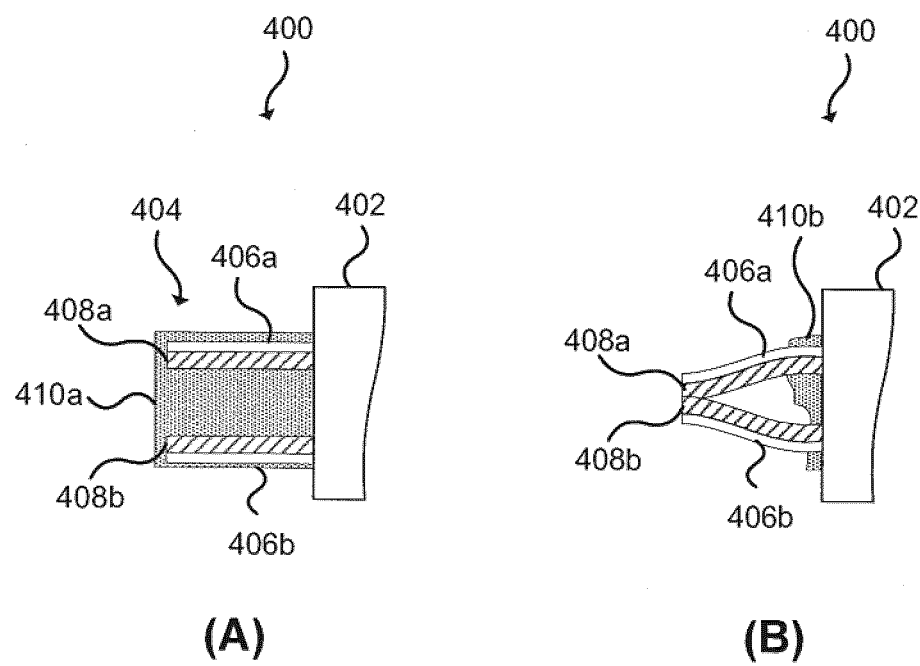
FIGS. 4A, 4B depict a further predation tracking tag.

FIGS. 4A, 4B depict a further predation tracking tag. The tag 400 is similar to the tags described above and comprises a body 402 and an external sensor component capable of measuring a characteristic of the tag. The sensor 404 comprises two resilient electrodes, each comprising a resilient material 406a, 406b and a conductive material 408a, 408b. As depicted in FIG. 4A, the pH sensitive material 410a is cast in order to prevent the resilient electrodes from contacting each other. When an acidic environment substantially degrades the pH sensitive material 410b as depicted in FIG. 4B, the resilient material 406a, 406b of the electrodes cause the electrically conductive material 408a, 408b to come into contact with each other. The tag 400, or more particularly a microcontroller of the tag, can detect the newly established electrical connection between the two electrodes, which may be used as an indication that the marine animal being tracked was eaten by a predator. Once the tag detects the electrical connection between the electrodes, the tag may switch from the first mode of operation associated with tracking the animal originally tagged to a second mode of operation associated with the originally tagged animal being eaten by a predator.

Figure 5:
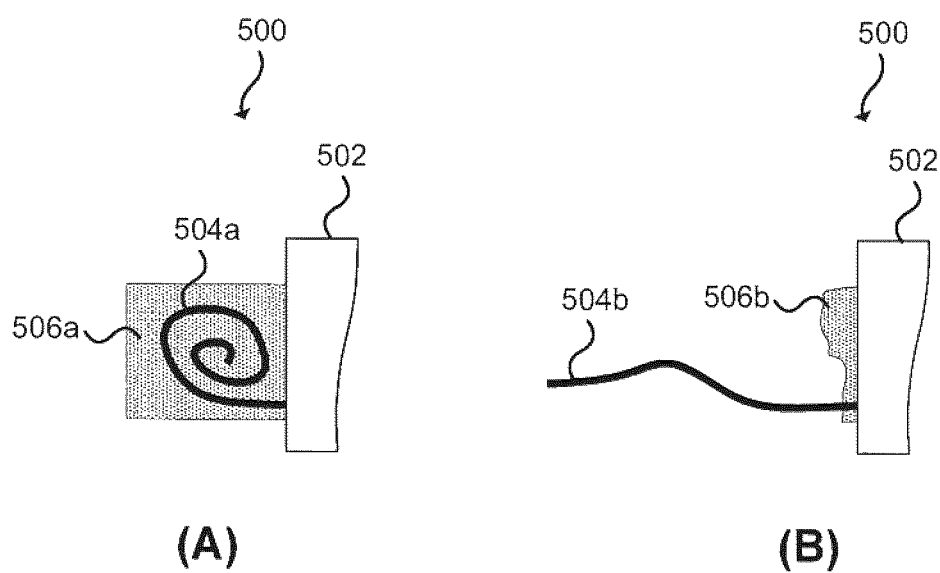
FIGS. 5A, 5B depict a further predation tracking tag.

FIGS. 5A, 5B depict a further predation tracking tag. The tag 500 is similar to the tags described above and can detect a change in a characteristic of the tag 500 when the environment the tag is in changes from a neutral or basic environment, such as that found in coelomic fluid, to an acidic environment such as that found in the gut of a predator. The tag 500 comprises a body 502 and a sensor for measuring a characteristic of the tag. The sensor is depicted as a strain gauge 504*a* or other similar sensor that changes its electrical characteristics based on the shape of the sensor 504*a*. As depicted in FIG. 5A, the strain gauge 504*a* may be cast within a pH sensitive material 506*a* in order to maintain the strain gauge 504*a* in a first configuration. As depicted in FIG. 5B, when the acidic environment substantially degrades the pH sensitive material 506*b*, the strain gauge 504*b* changes configurations, reducing the strain, which may be detected by the tag and used as an indication that the animal being tracked was eaten by a predator.

Figure 6:
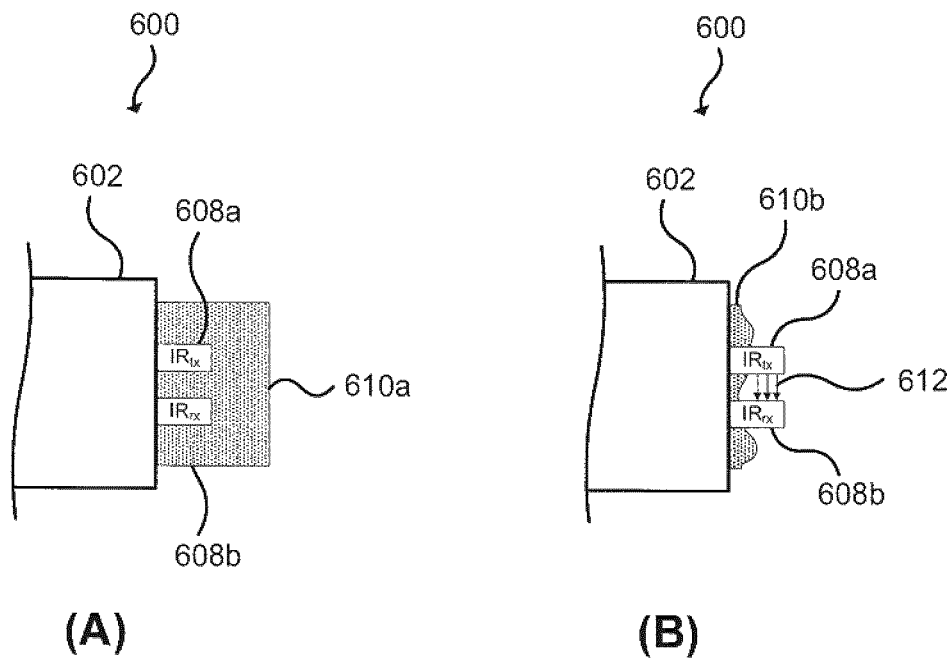
FIG. 6A, 6B depict a further predation tracking tag.

FIG. 6A, 6B depict a further predation tracking tag. The tag 600 is similar to the tags described above and can detect a change in a characteristic of the tag 600 when the environment the tag is in changes from a neutral or basic environment, such as that found in coelomic fluid, to an acidic environment such as that found in the gut of a predator. The tag 600 comprises a body 602 and a sensor for measuring a characteristic of the tag. The sensor is depicted as an infrared (IR) transmitter and receiver pair 608*a*, 608*b*. The IR transmitter 608*a* and IR receiver 608*b* are encased in pH sensitive material 610*a* that degrades in an acidic environment. The pH sensitive material 610*a* is opaque so that when present, as depicted in FIG. 6A, infrared light transmitted from the IR transmitter 608*a* is not received at the receiver 608*b*. When the pH sensitive material 608*b* is degraded as depicted in FIG. 6B, infrared light transmitted from the IR transmitter 608*a* is received at the IR receiver 608*b* as depicted by arrows 612. The detection of the infrared light at the receiver 608*b* may be detected by the electronics of the tag and used as an indication that a predation event has occurred.

Figure 7:
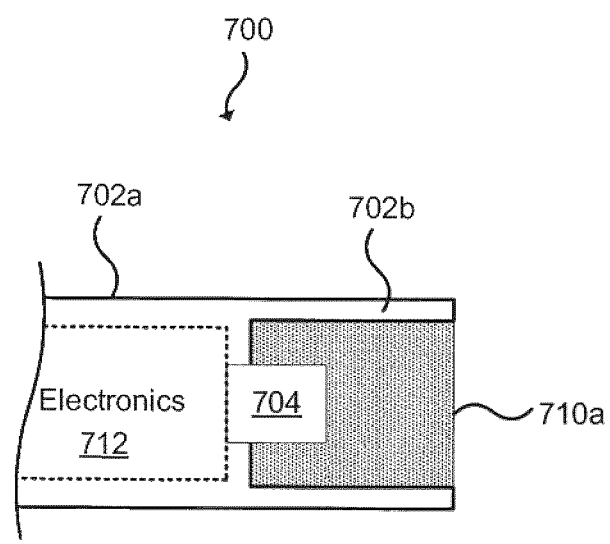
FIG. 7 depicts a further predation tracking tag.

FIG. 7 depicts a further predation tracking tag. The tag 700 may be similar to the tags described above, however the body of the tag is extended to provide physical protection to the predation sensors. The predation tags described above may include a predation sensor that extends past the body of the tag. Due to the small size of the tags, the extending predation sensors may be susceptible to breaking. The predation tag 700 comprises a body that provides protection to the predation sensor 704. The body comprises a main body portion 702*a* that encases the electronics 712 of the tag. The main body portion 702*a* may be provided by a tube or other similar structure. The body further comprises a hollow extending portion 702*b* that extends past the predation sensor 704 and provides physical protection to the predation sensor against damage. The hollow cavity of the extending body portion 702*b* may be filled or partially filled with pH sensitive material 710*a*. The extending portion 702*b* of the tag body is open at one end in order to expose the pH sensitive material to the environment of the tag so that the pH sensitive material will degrade when a predation event occurs.

Figure 8:
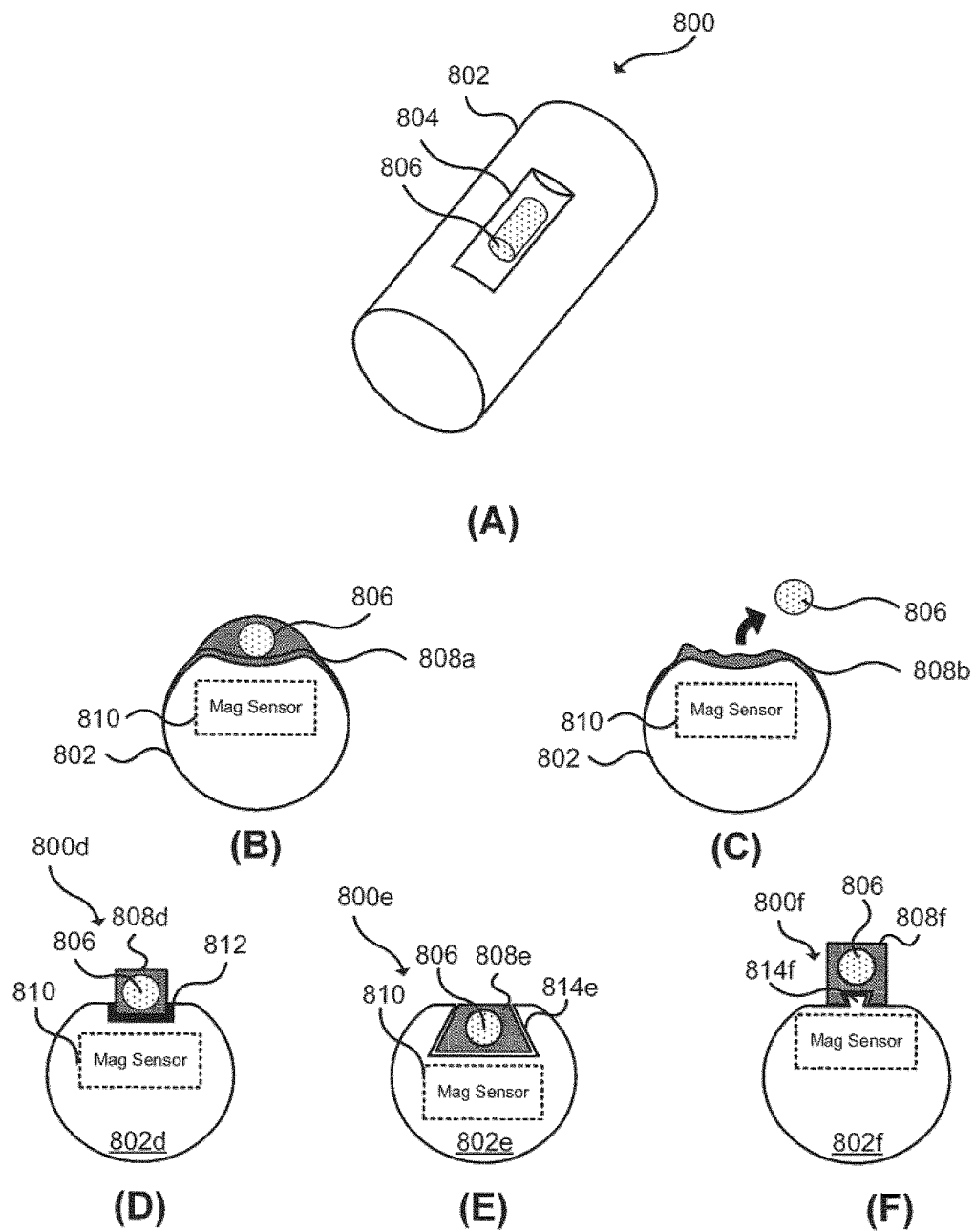
FIGS. 8A, 8B, 8C, 8D, 8E, 8F depict further predation tracking tags.

FIGS. 8A, 8B, 8C, 8D, 8E, 8F depict further predation tracking tags. The tag 800 is similar to the tag 200; however, rather than using electrodes to detect a change in an electrical characteristic, the tag 800 uses a magnetic sensor 810 to detect the presence or absence of a magnet 806. As depicted in FIG. 8A, the tag 800 includes a body 802 that has a recessed portion 804 for receiving a magnet 806. Although depicted as being situated within a recess 804, it is contemplated that the magnet may be affixed to the tag without being situated within a recess. The magnet 806 is affixed to the tag 800 by a pH sensitive material 808*a* as depicted in FIG. 8B. The magnet 806 may be affixed by a layer of pH sensitive material that acts as an adhesive to hold the magnet 806 in place while a further coating of pH sensitive material is used to further adhere the magnet 806 to the tag 802. As previously described, the pH sensitive material degrades in the acidic environment of a predator's gut. Once the acidic environment degrades the pH sensitive material 808*b* that affixes the magnet 806, the magnet 806 may separate from the tag 800 and the absence of the magnet may be detected by the tag 800. Once the absence of the magnet 806 is detected by the tag 800, the tag may switch modes of operation to indicate that a predation event has been detected.

The magnet and pH sensitive material may be attached to the tag body in other manners than described above. For example, a further tag 800*d* is depicted in FIG. 8D. As depicted, the magnet 806 may be encased in a plug 808*d* made of the pH sensitive material, and the plug 808*d* may be attached to a body 802*d* in various ways, including for example by way of an adhesive material 812.

A further example of a tag 800*e* is depicted in FIG. 8E. As depicted, the magnet 806 may be encased in plug 808*e* of the pH sensitive material. The plug 808*e* is shaped to allow the plug to be mechanically retained within a correspondingly shaped cavity portion 814*e* of the tag body 802*e*, until at least a portion of the pH sensitive material is dissolved. A still further example of a tag 800*f* is depicted in FIG. 8F. As depicted, the magnet 806 may be encased in plug 808*f* of the pH sensitive material; however, rather than being retained in a corresponding cavity of the tag as described above, the plug 808*f* comprises a corresponding cavity that mechanically retains a correspondingly shaped protruding portion 814*f* of the tag body 802*f*.

The tags 800, 800*d*, 800*e*, 800*f* described above rely on the magnet separating from the tag. While such separation may occur, it may be desirable to provide an additional force to aid in the separation, or at least movement of the magnet, to change the magnetic field detected by the sensor. Such a force may be provided by including a magnetic attractor in the tag. The magnetic attractor provides a force to the magnet which will tend to result in movement of the magnet upon partial or full degradation of the pH sensitive material. Although the magnetic attractor is described as providing an attractive force, it will be appreciated that a repulsive force may be provided and may have the same effect. That is, both attraction and repulsion of the magnet may be provided by the magnetic attractor. Implementation of a tag comprising a magnetic attractor is described in more detail with respect to FIGS. 9-11.

Figure 9:
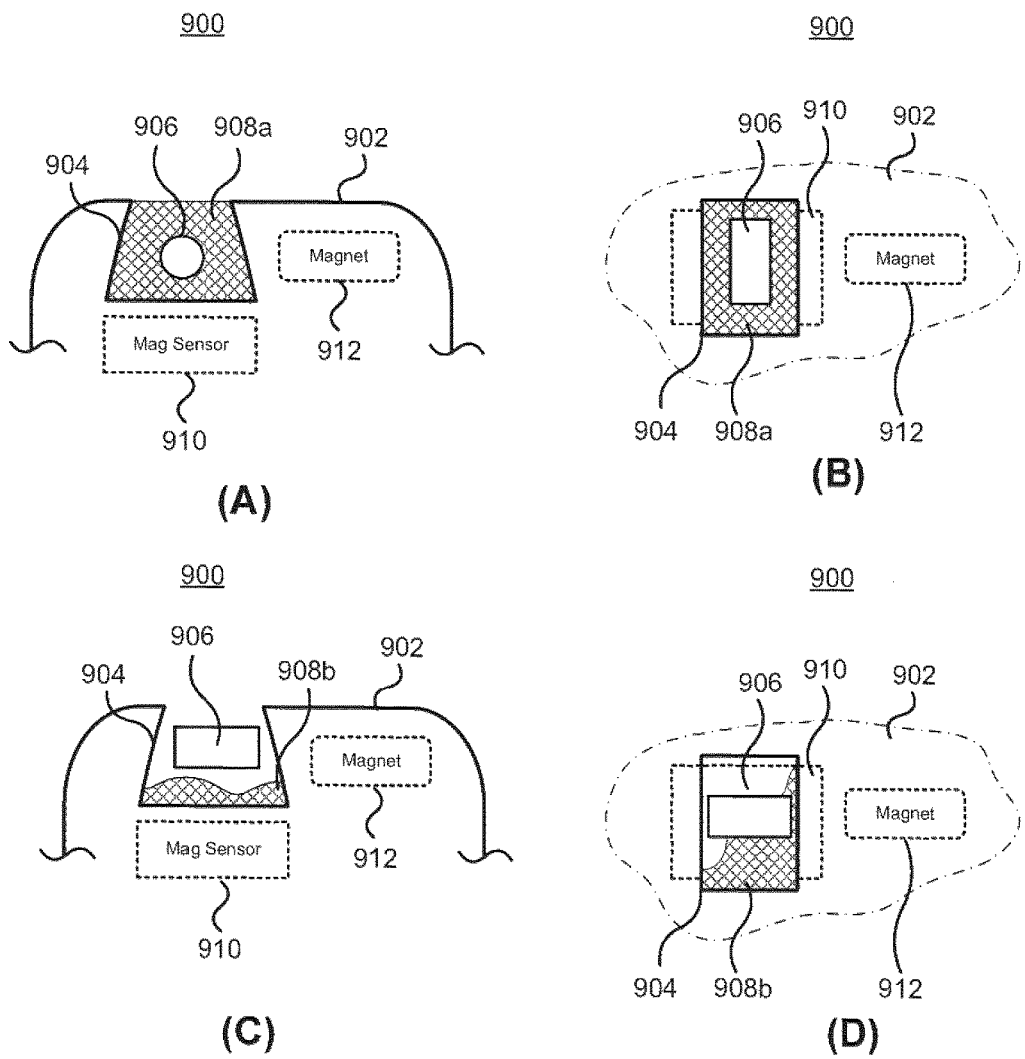
FIGS. 9A, 9B, 9C, 9D depict a further predation tracking tag.
Figure 10:
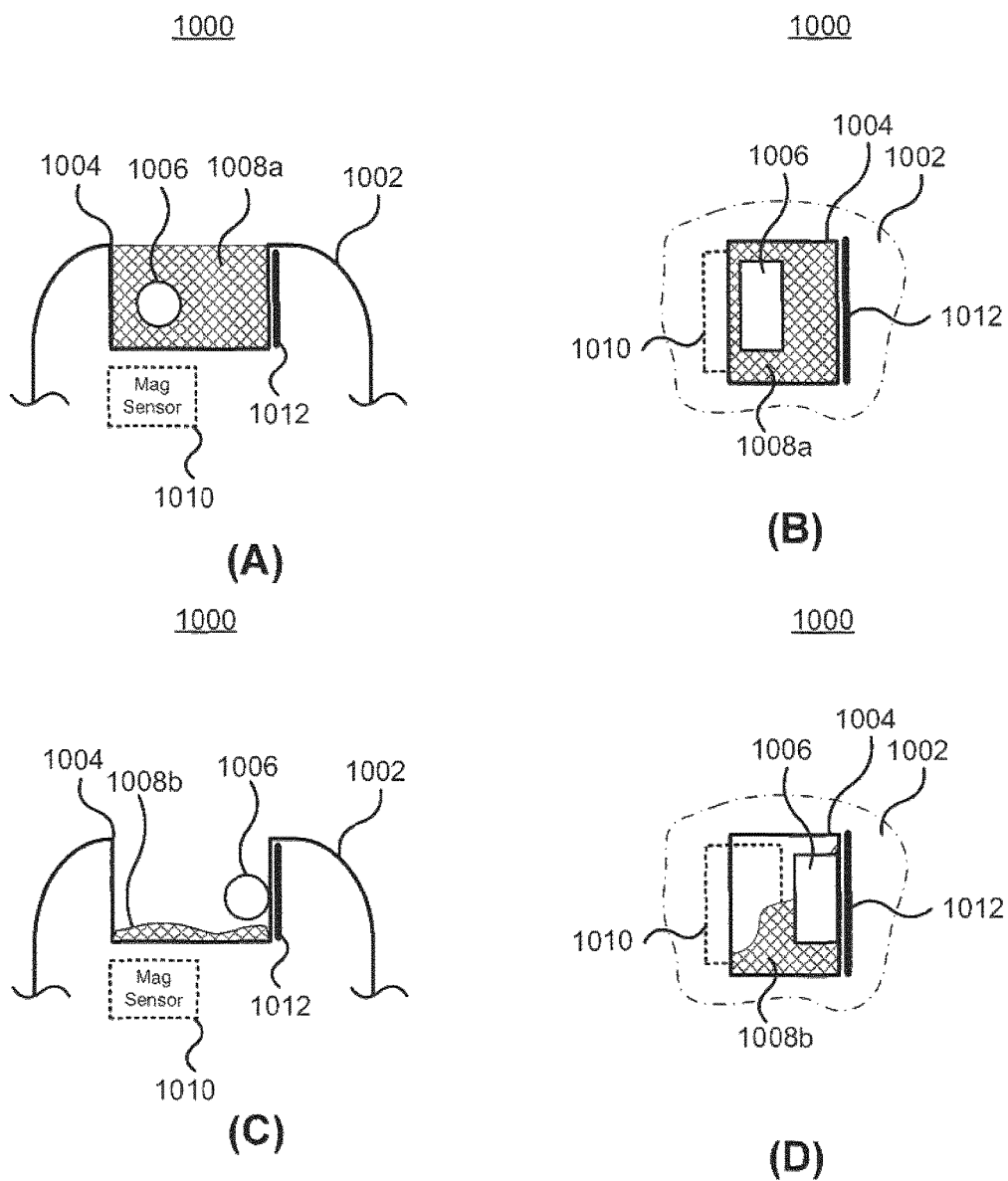
FIGS. 10A, 10B, 10C, 10D depict a further predation tracking tag.

FIGS. 9A through 9D depict a further predation tag 900. FIGS. 9A through 9D may be referred to collectively as FIG. 9 where such reference does not cause any ambiguity or lack of clarity. As depicted, a first magnet 906, which may be referred to as a sensing magnet, is encased, or at least partially encased, in the pH sensitive material 908*a*. The sensing magnet 906 and the pH sensitive material 908*a* may form a plug that is shaped such that it is mechanically retained within a correspondingly shaped cavity portion 904 of the tag body 902. A magnetic field sensor 910 is situated beneath cavity portion 902, and is oriented such that an axis of sensitivity of the sensor 910 is parallel, or at least generally parallel, to the magnetic field of sensing magnet 906. As such, when the sensing magnet 906 is arranged with its magnetic field aligned with the sensor's axis of sensitivity as depicted in FIGS. 9A and 9B, the sensor detects the magnetic field. The magnetic attractor, which provides a force tending to move the sensing magnet when it is not retained by the pH sensitive material, may be provided by a second magnet 912. The second magnet 912, which may be referred to as an attraction magnet, may be embedded within the tag body. The second magnet 912 may be permanently secured to the tag body 902 in close proximity to cavity portion 904 so that the magnetic fields of the second magnet and the sensing magnet interact with each other and exert forces on the magnets. As depicted in FIG. 9 the second magnet 912 may be positioned such that its magnetic field is perpendicular, or at least generally perpendicular, to the magnetic field of the sensing magnet. With the magnetic field of the sensing magnet 906 generally aligned with the axis of sensitivity of magnetic field sensor 910, the magnetic field of the second magnet 912 does not substantially affect the sensor. This alignment of the sensing magnet 906 with the axis of sensitivity of magnetic field sensor 910, plus the perpendicular positioning of the magnetic field of the second magnet 912 relative to the magnetic field of the sensing magnet, works to prevent detection of the magnetic field of the second magnet 912 by the sensor 910. Accordingly, prior to a predation event, with the sensing magnet 906 encased in the pH sensitive material as depicted in FIGS. 9A and 9B, the sensor 910 detects the magnetic field of the sensing magnet 906 that is at least generally parallel to the sensor's axis of sensitivity.

During a predation event, the pH sensitive material will degrade. For example, as depicted in FIGS. 9C and 9D, the pH sensitive material 908b is degraded as a result of a predation event. Once the pH sensitive material has sufficiently degraded, the sensing magnet 906 may be released from the pH sensitive material of the tag and may become loose within cavity 904. With the sensing magnet released, magnetic interaction between the sensing magnet 906 and second magnet 912 will cause the sensing magnet 906 to move or rotate such that it becomes substantially parallel to second magnet 912 as illustrated in FIGS. 9C and 9D. This results in the magnetic field of sensing magnet 906 becoming perpendicular to the axis of sensitivity of magnetic field sensor 910, thereby causing the sensor to no longer detect the presence of a magnetic field. The stationary second magnet 912 provides a magnetic attractor that tends to cause the sensing magnet 906 to rotate when released from the pH sensitive material 908b and align its magnetic field with that of the second magnet 912, thereby causing a detectable change of the magnetic field detected by the sensor 910.

It will be appreciated that the orientation of one or more of the sensor, sensing magnet and magnetic attractor may be varied. For example, one or more of the sensor, sensing magnet and magnetic attractor may be arranged so that the magnetic field of the sensing magnet is initially perpendicular to the axis of sensitivity of the sensor, resulting in the sensor not sensing the presence of the sensing magnet, and subsequently upon degradation of the pH sensitive material parallel to the axis of sensitivity of the sensor, resulting in the sensor sensing the presence of the sensing magnet and thereby sensing a predation event. However, in such an embodiment, the second magnet may need to be located sufficiently far from the sensor so that the strength of its magnetic field is below a detection threshold at the sensor, while still providing a force on the sensing magnet. Additionally or alternatively, the sensor may detect a strength of the magnetic field, or changes in the strength of the magnetic field.

FIGS. 10A through 10D depict a further predation tag 1000. FIGS. 10A through 10D may be referred to collectively as FIG. 10 where such reference does not cause any ambiguity or lack of clarity. The tag 1000 is similar to the tag 900 described above with reference to FIG. 9 in that the tag 1000 includes a magnetic attractor for causing, or at least tending to cause, movement of the sensing magnet 1006 when released from the pH sensitive material 1008a. However, in contrast to the tag 900 which includes a second magnet 912 that tends to cause the sensing magnet 906 to rotate to align its magnetic field axis with that of the second magnet 912 upon degradation of pH sensitive material, the magnetic attractor of the tag 1000 comprises a ferromagnetic material 1012 that the sensing magnet is attracted to. Although depicted as a ferromagnetic piece of material, the magnetic attractor 1012 may comprise a second magnet that the first magnet would be attracted to. Further, rather than detecting an alignment, or mis-alignment, of the magnetic field, the sensor 1010 may detect the presence or absence of a magnetic field, or a magnetic field above a threshold. As depicted, the magnetic sensor 1010 is aligned under a cavity 1004 within the body 1002 of the tag 1000. The sensor 1010 is positioned to detect the presence of the sensing magnet 1006 when the sensing magnet 1006 is located in a first location depicted in FIGS. 10A and 10B. The sensing magnet 1006 may be secured within the cavity 1004 in the first location by the pH sensitive material 1008a.

During a predation event, the pH sensitive material 1008b is degraded sufficiently to release the sensing magnet 1006. When released, the sensing magnet 1006 may be loose within cavity 1004. The sensing magnet 1006 is attracted to the ferromagnetic material 1012 of the magnetic attractor and as such moves towards the ferromagnetic material 1012. The movement of the sensing magnet 1006 causes it to move out of the first location where the magnetic sensor 1010 detects its presence and into a second location where the sensing magnet 1006 is not detected by the magnetic sensor 1010. The ferromagnetic material 1012 provides a magnetic attractor that tends to cause the sensing magnet 1006 to move when released from the degraded pH sensitive material 1008b, thereby resulting in a detectable change of the magnetic field detected by the sensor 1010.

Figure 11:
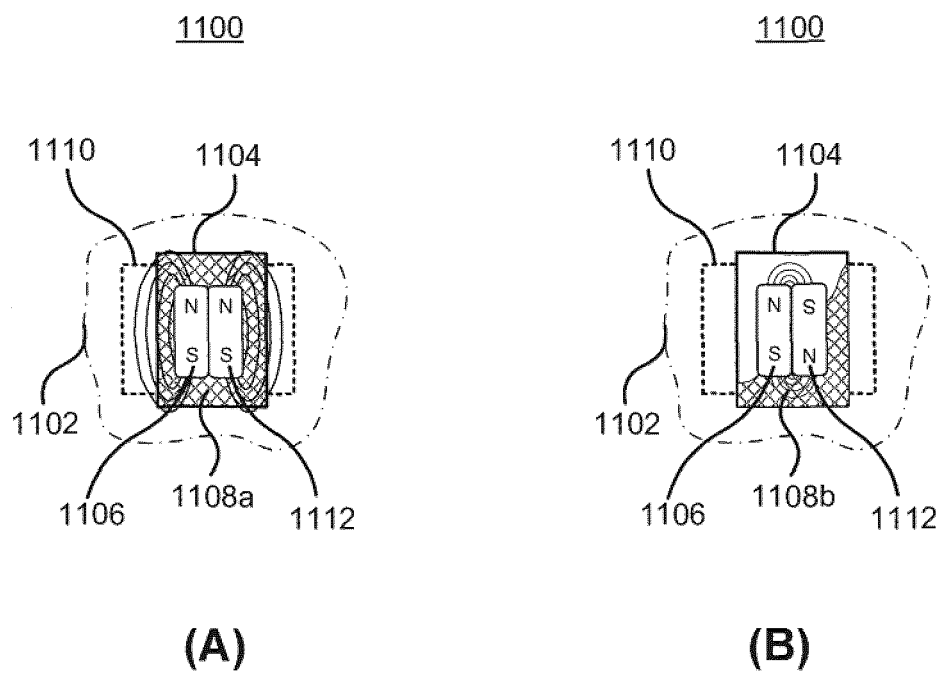
FIGS. 11A, 11B depict a further predation tracking tag.

FIGS. 11A and 11B depict a further predation tag 1100. FIGS. 11A and 11B may be referred to collectively as FIG. 11 where such reference does not cause any ambiguity or lack of clarity. The tag 1100 includes a first magnet 1106, which may be considered at least conceptually as a sensing magnet. The tag 1100 further includes a second magnet 1112, which may be considered at least conceptually as an attraction magnet.

However, in contrast to the tag 900 in which the attraction magnet 912 is permanently fixed to the tag body, the second magnet 1112 is not permanently fixed to tag body 1102. Rather, the second magnet 1112 is secured or located against or adjacent to first magnet 1106 by the pH sensitive material 1108a. The first magnet 1106 and the second magnet 1112 are secured to each other with their respective magnetic fields aligned, that is like poles are adjacent each other, so that the magnetic fields add constructively, thereby resulting in a relatively large magnetic field detected by sensor 1110. As depicted in FIG. 11A, when secured by the pH sensitive material 1108a, the first magnet 1106 and second magnet 1112 are aligned with their north poles adjacent and south poles adjacent.

During a predation event, the pH sensitive material degrades sufficiently to allow the second magnet 1112 to rotate relative to the first magnet 1106, or vice versa. The initial alignment of the magnets and their corresponding magnetic fields will tend to cause the magnets to 'flip' relative to each other so that the first magnet's south pole is adjacent the second magnet's north pole, and the first magnet's north pole is adjacent the second magnet's south pole. With the opposite poles located adjacent each other, the respective magnetic fields of the first magnet 1106 and the second magnet 1112 will add destructively resulting in a smaller magnetic field being detected by the sensor 1110. Accordingly, the second magnet 1112 causes, or at least tends to cause, movement of the first magnet 1106, and vice versa, thereby causing a detectable change in the magnetic field. It will be appreciated that more than two magnets may be employed in a variation of the above-described embodiment.

The first and second magnets may be indistinguishable from each other. However, in combination, each acts as a sensing magnet and as an attraction magnet to the other magnet. The use of a plurality of individual magnets secured within a pH sensitive material with their magnetic fields aligned such that their magnetic fields add constructively may be applied to magnetic particles embedded within the pH sensitive material in order to provide a degradable magnet. The magnetic particles may be embedded within the pH sensitive material and an external magnetic field used to magnetize the embedded particles so that their magnetic fields are aligned and add constructively to provide a magnetic field that is detectable by the sensor. When the pH sensitive material is degraded by the acidic environment, the magnetic particles are released and free to rotate or otherwise move relative to each other and as such, will exert forces on the other magnetic particles such that the magnetic fields will align to cancel out and result in no net magnetic field.

Various tags have been described above that can be used to track a marine animal and also provide an indication that the animal has been eaten by a predator. Although particular embodiments have been described with reference to tags for tracking marine animals, it is possible for a similar tag to be used to track other animals. In the case of tracking non-aquatic animals, the ultrasonic signals may not be useful and as such the transducer of the tag may be replaced with an appropriate transducer of signals that may be detected and used for tracking the non-aquatic animal. For example, the transducers may use radio frequency (RF) signals rather than the ultrasonic signals used for marine environments.

The tags described above with reference to FIGS. 9, 10, 11 each comprise a predation detector that comprises a magnetic sensor, a first magnet at least partially encased in pH sensitive material and a magnetic attractor arranged such that upon degradation of the pH sensitive material the first magnet is free to move and the magnetic attractor provides a force that tends to cause the magnet to move. The movement of the first magnet results in a change in the magnetic field sensed by the sensor. When the electronics of the tag, or other circuitry, detect a change in the magnetic field, or a magnetic field that meets other characteristics, such as the presence or absence of the magnetic field, a predation event may be triggered. The predation detection described above may be suited for incorporation into a wide range of animal tracking tags, whether for tracking aquatic, land or airborne animals. The tags may telemeter data from various other sensors and may transmit, store and/or process the information in various ways, which may be affected by detection of a predation event. The transmission of information from the tag may use different transducers such as acoustic transmitters, active radio frequency transmitters and/or passive radio frequency transmitters such as RFID tags. The logging or storing of the information may be to volatile or non-volatile memory of the tag for subsequent analysis if the tag is retrieved.

With non-aquatic animals, a tag is often attached externally rather than implanted internally into the coelomic cavity. In such embodiments the tag with the predation detector may benefit from protection against impact, abrasion and UV light, since these may degrade the pH sensitive material potentially causing the tag to falsely detect a predation event. This protection could be accomplished by mechanical shielding. The effects of external liquids (e.g. rain, ground water, etc) on the predation detector will depend on their specific chemistry at the site. Such characteristic may need to be considered to determine if the potential study conditions are suitable to avoid false detection of predation events.

Applications to non-aquatic animals may be practically limited to small animals that are more-or-less fully consumed by a large predator such that the tag is actually swallowed intact. This would be the case, for example, when a snake consumes its prey whole. In other cases where the predator only partially consumes the prey or eats it a bit at a time, it may not swallow the tag at all or may damage it. For medium to large animals, tags are typically attached by means of a collar made of some combination of metal, plastic and leather, and a predator is not likely to eat such a collar.

The tags described herein are battery operated and are generally activated prior to being tagged to an animal. Tags may include a magnetic sensor in order to provide a means of activating the tags. The tags may be inserted into a magnetic field produced by an activation device. The magnetic sensor of the tag detects the magnetic field, which may provide instructions for activating the tag.

Figure 12:
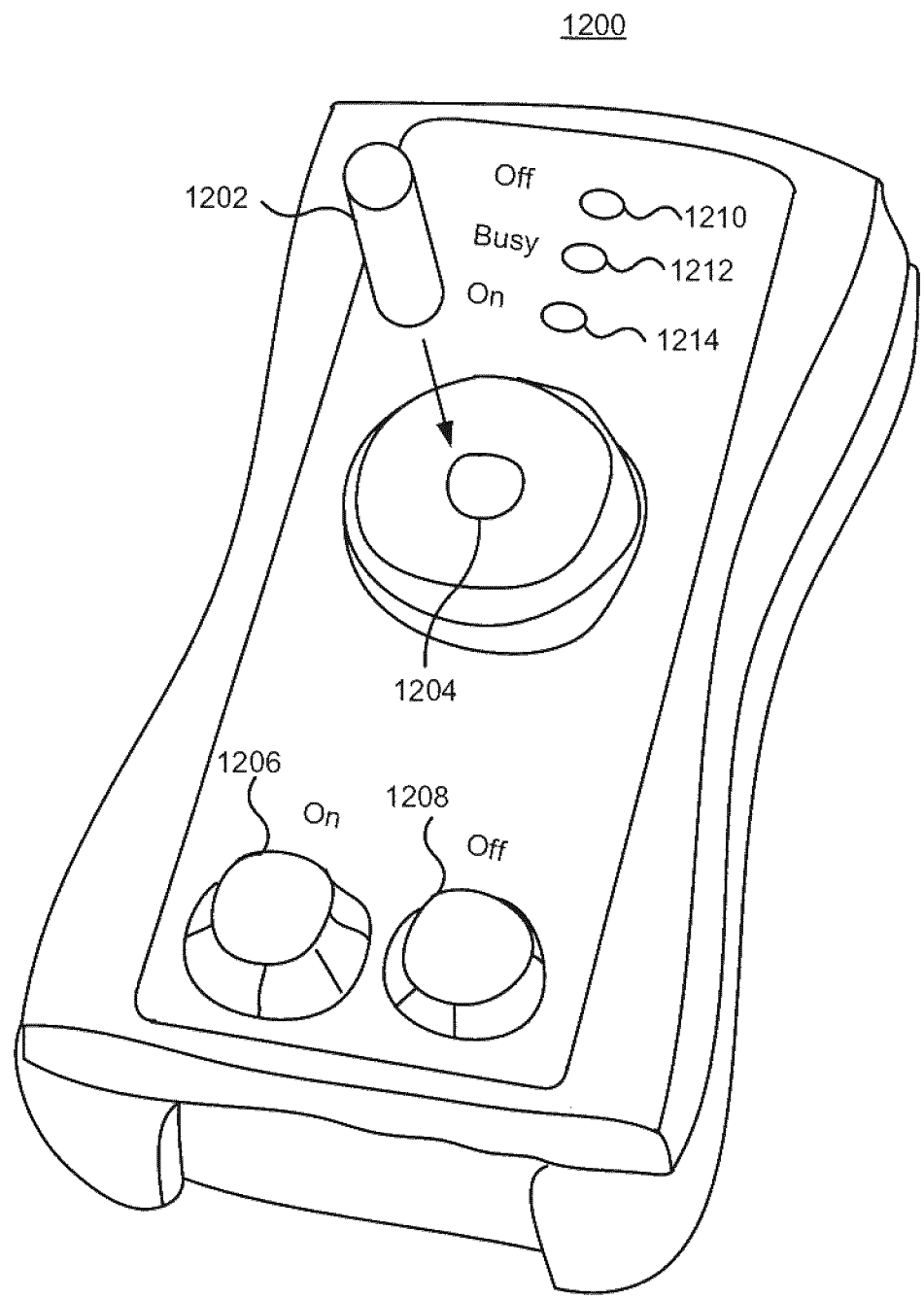
FIG. 12 depicts an activator for activating a predation tracking tag.

FIG. 12 depicts an activator for activating a tracking tag. The activator 1200 may be handheld device into which a tag 1202 to be activated is inserted. The activator 1200 has a chamber 1204 into which the tag can be placed. An electromagnetic coil may be wound around the chamber 1204 so that when the tag is placed within the chamber 1204, it is within a magnetic field of the coil. The magnetic field produced by the coil can be controlled by the activator 1200 and may communicate activation commands to tags.

It may be possible to communicate other information from the activator to the tag by controlling the magnetic field produced by the coil. For example, an operation mode of the tag may be set, or transmission frequency or other options may be controlled. The activator may also de-activate tags in a similar manner. The activator 1200 includes input and output components for controlling the operation of the activator. For example, the activator may have an 'On' button 1206 that is used for activating the tag. An 'Off' button 1208 may be used to deactivate an activated tag. The activator 1200 may include outputs or display means for providing information about the tag. For example, the activator may include an 'Off' LED 1210 that may be used to indicate that the tag is deactivated. A 'Busy' LED 1212 may indicate that the activator is currently busy, for example it may be attempting to activate or deactivate a tag. An 'On' LED 1214 may indicate that the tag has been successfully activated. In order to determine if the tag has been successfully activated or deactivated, the activator 1200 may listen for the ultrasonic transmission of the tag.

Figure 13:
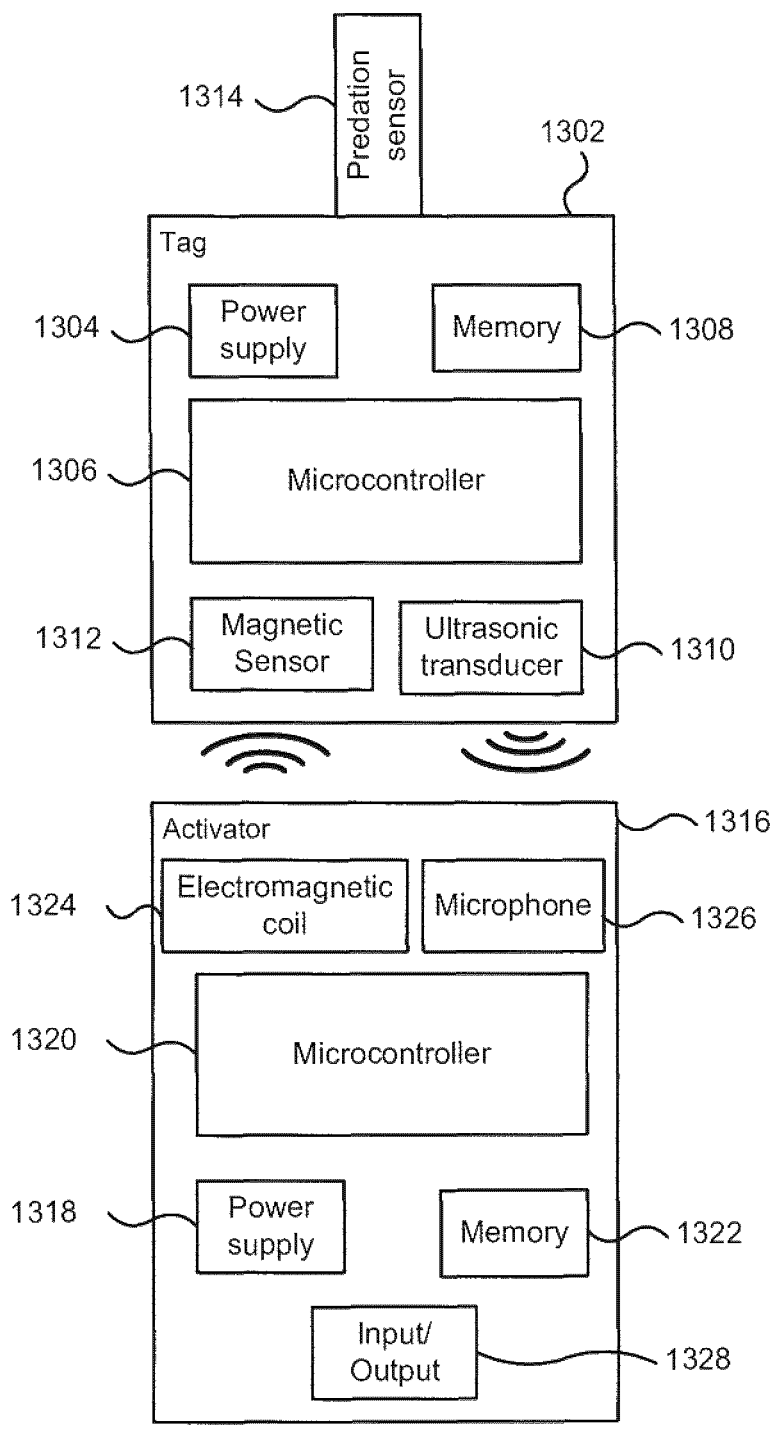
FIG. 13 depicts components of a predation tracking tag and an activator.

FIG. 13 depicts components of the tracking tag of FIGS. 2A-C and an activator. As described above, an activator may be used to activate a tag. A tag 1302 may comprise a power supply 1304, such as a battery, a microcontroller 1306, or other type of circuit for controlling the operation of the tag 1302. The tag 1302 may also include memory 1308 for storing instructions and/or data. Although depicted as being a separate component from the microprocessor 1306, the memory 1308 or at least a portion of the memory 1308 may be part of the microcontroller 1306. The tag may further comprise an ultrasonic transducer 1310 for transmitting information, such as the unique ID, when the tag is activated. The tag 1300 may also include a magnetic sensor 1312 that is used to receive instructions from the activator. Further, as described above, the tag 1302 may include a predation sensor 1314 for measuring a characteristic of the tag that will change when in an acidic environment.

The activator 1316 includes a power supply 1318, a microcontroller 1320 for controlling operation of the activator as well as memory 1322 for storing instructions and/or data used by the microcontroller 1320. The microcontroller 1320 may control an electromagnetic coil 1324 in order to generate a magnetic field used to communicate commands to the tag when the tag is located within the generated magnetic field. The commands may include commands for activating and/or deactivating the tag as well as for setting operational parameters of the tag. The activator 1316 may include a microphone 1326 for detecting the ultrasonic pulses transmitted by the tag once activated. Although not depicted, the activator may include a display for displaying the unique ID of the tag. The activator 1316 may include input/output components 1328 in order to allow a user to interact with the activator 1316 to activate and de-activate, as well as possibly configure tags.

Figure 14:
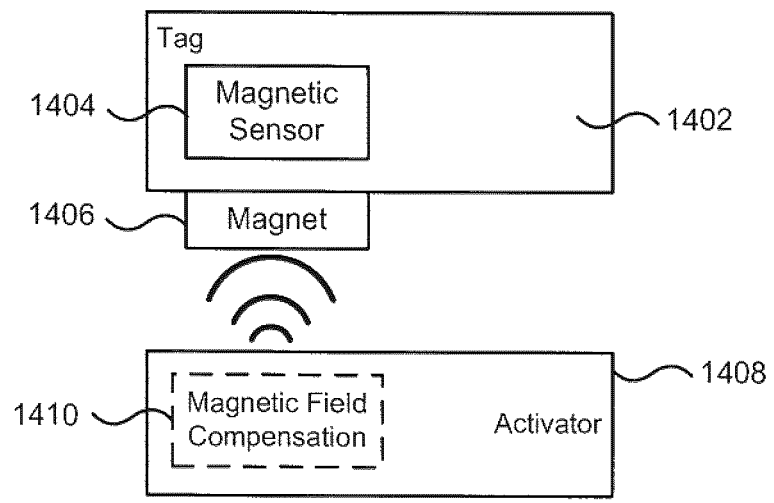
FIG. 14 depicts components of a further predation tracking tag and an activator.

FIG. 14 depicts components of a predation tracking tag and an activator. The tag 1402 is similar to the tag 1302 described above with reference to FIG. 13 and as such only the differences are depicted. Also, the activator 1408 is similar to the activator 1316 and as such only the differences are depicted. The tag 1402 uses the magnetic sensor 1404 to detect the presence or absence of a magnet 1406. As described above, the magnet 1406 can be affixed to the tag using the pH sensitive material. While the magnet 1406 provides a convenient means for detecting a predation event, its presence near the magnetic sensor 1404 may overwhelm the magnetic field generated by the activator and make the activation process difficult. The activator 1408 may include magnetic field compensation functionality 1410 for overcoming the magnetic field of the magnet 1406 in order to communicate with the tag. The magnetic field compensation functionality 1410 may generate a varying magnetic field in order to determine the magnetic field required to cancel, or counteract, the magnetic field of the magnet 1406. Once the activator determines the magnetic field required to compensate for the presence of the magnet 1406, it can be used as a base line in varying the magnetic field to allow communication between the activator 1408 and tag 1402. With the magnetic field of the magnet 1406 cancelled at the sensor 1404 by the base line magnetic field compensation, the magnetic sensor 1404 can detect changes in the magnetic field caused by the activator, and as such the activator may communicate with the tag 1402.

Once a tag is activated it may be implanted into a coelomic cavity of a marine animal, or otherwise attached to the animal, and the animal may be released and tracked using the tag.

Figure 15:
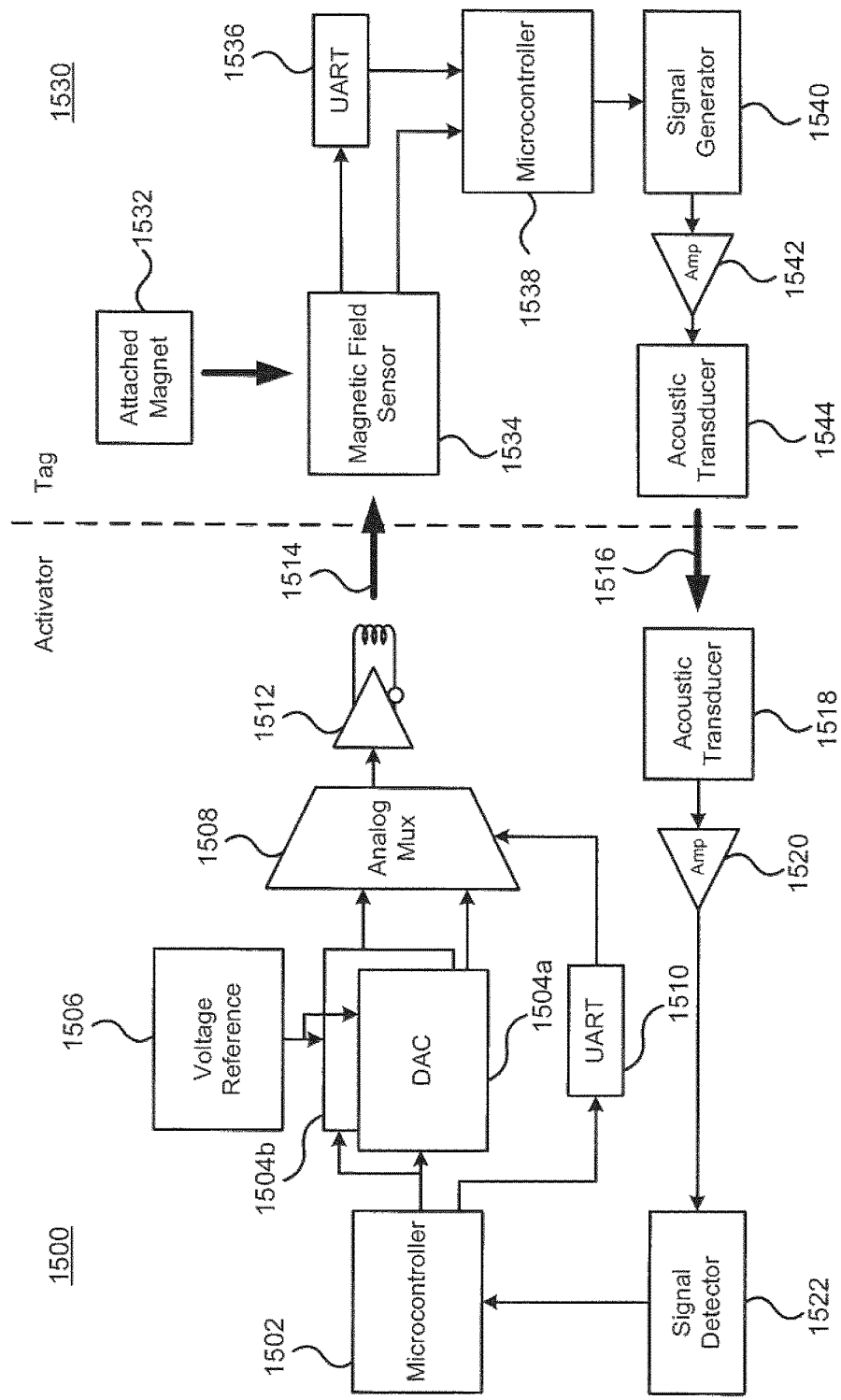
FIG. 15 depicts components of the predation tracking tag of FIGS. 8A-F, 9A-D, 10A-D and/or 11A-B, and an activator.

FIG. 15 depicts components of a magnetic predation tracking tag and an activator. The magnetic predation tracking tag may be, for example, a tag such as the tags of FIGS. 8A-F, FIGS. 9A-D, FIGS. 10A-D and FIGS. 11A-B. The activator 1500 comprises a microcontroller 1502 that controls a number of digital to analog converters (DACs) 1504a, 1504b (referred to collectively as DACs 1504) and a Universal Asynchronous Receiver/Transmitter (UART) 1510. A reference voltage 1506 is supplied to the DACs 1504, whose outputs are provided to an analog multiplexer 1508. The output of the analog multiplexer 1508 is controlled by the UART 1510 and supplied to a coil driver 1512 to produce a magnetic field 1514. In order to receive information from the tag 1530, the activator includes an acoustic transducer 1518 that detects acoustic signals 1516 from the tag. The output of the acoustic transducer 1518 is provided to an amplifier 1520 to amplify the signal which is provided to a signal detector 1522 and the results supplied to the microcontroller 1502.

The tag 1530 includes a magnetic field sensor 1534. The magnetic field sensor 1534 may use a GMR (giant magneto resistive) sensor, but alternative designs could use a mechanical reed switch, Hall effect sensor or other type of sensor. Typically, these sensors have a digital output that will output a "1" if an external magnetic field is present, and a "0" if no magnetic field is present, or vice versa. Typically a minimum magnetic field level is required in order for these sensors to indicate that a field is present. The magnetic field sensor provides its output to a UART 1536, which provides it to a microcontroller 1538. Alternatively, the magnetic field sensor output may be provided to the microcontroller 1538. The microcontroller processes the magnetic field information in order to control operation of the tag. The microcontroller may output information to a signal generator 1540 which generates a signal that is amplified by an amplifier 1542 and provided to an acoustic transducer 1544 that produces an acoustic signal 1516. As described above, the acoustic signal 1516 may be detected by the activator 1500.

When the predation detection magnet 1532 is attached to the tag 1530, the magnetic sensor 1534 will detect the field of the magnet 1532 and will indicate the presence of the magnetic field in its output. Without additional magnetic fields applied, the output will remain the same until the magnet is removed, either manually or by a predation event. Unfortunately this means that sending data into the tag becomes more difficult since simply varying a magnetic field will not be detected. In order to send data into the tag 1530, the activator 1500 has to apply a magnetic field with equivalent strength and opposite polarity, so that the magnetic sensor 1534 detects that no field is present. That is, the activator must apply an opposite magnetic field in order to counter act the magnetic field of the magnet.

The activator may generate a fixed magnetic field to counteract a known magnet strength. However, generating a fixed magnetic field may not be reliable since the magnetic field to be countered may vary from tag to tag. The magnet attached to the tag could be affixed in two different polarities as the magnets are relatively small at approximately 1×0.5 mm and don't have the poles labeled. Determining the orientation of the poles during assembly would be difficult. Further, the magnetic field of the magnet may have some variation on its field strength due to manufacturing/material tolerances. Additionally, the distance between the magnet and the magnetic field sensor may vary, due to mechanical variation in the construction of the case, thickness of base pH sensitive film, and positioning variation when the product assembler attaches the magnet to the tag. Finally, the customer using the tag activator could insert the tag into the activator in two possible orientations. The overall effect is that it is impractical to apply a fixed magnetic field level to the tag which would reliably cancel the predation magnet field and permit reliable data communication.

As described further below, it is possible to calibrate the activator in order to counter act the magnet's field and so allow communication between the activator and the tag. The activator may configure one of the DACs 1504a to provide an output that will generate the counter acting magnetic field and so cause the magnetic field sensor 1534 of the tag to indicate that no field is detected. The second DAC 1504*b* may be configured to provide an output that will generate a complementary field to cause the magnetic field sensor 1534 of the tag to indicate that a field is detected. The UART may then control the analog multiplexer in order to select which of the signals is used to drive the coil 1512 and so generate the magnetic field.

Figure 16:
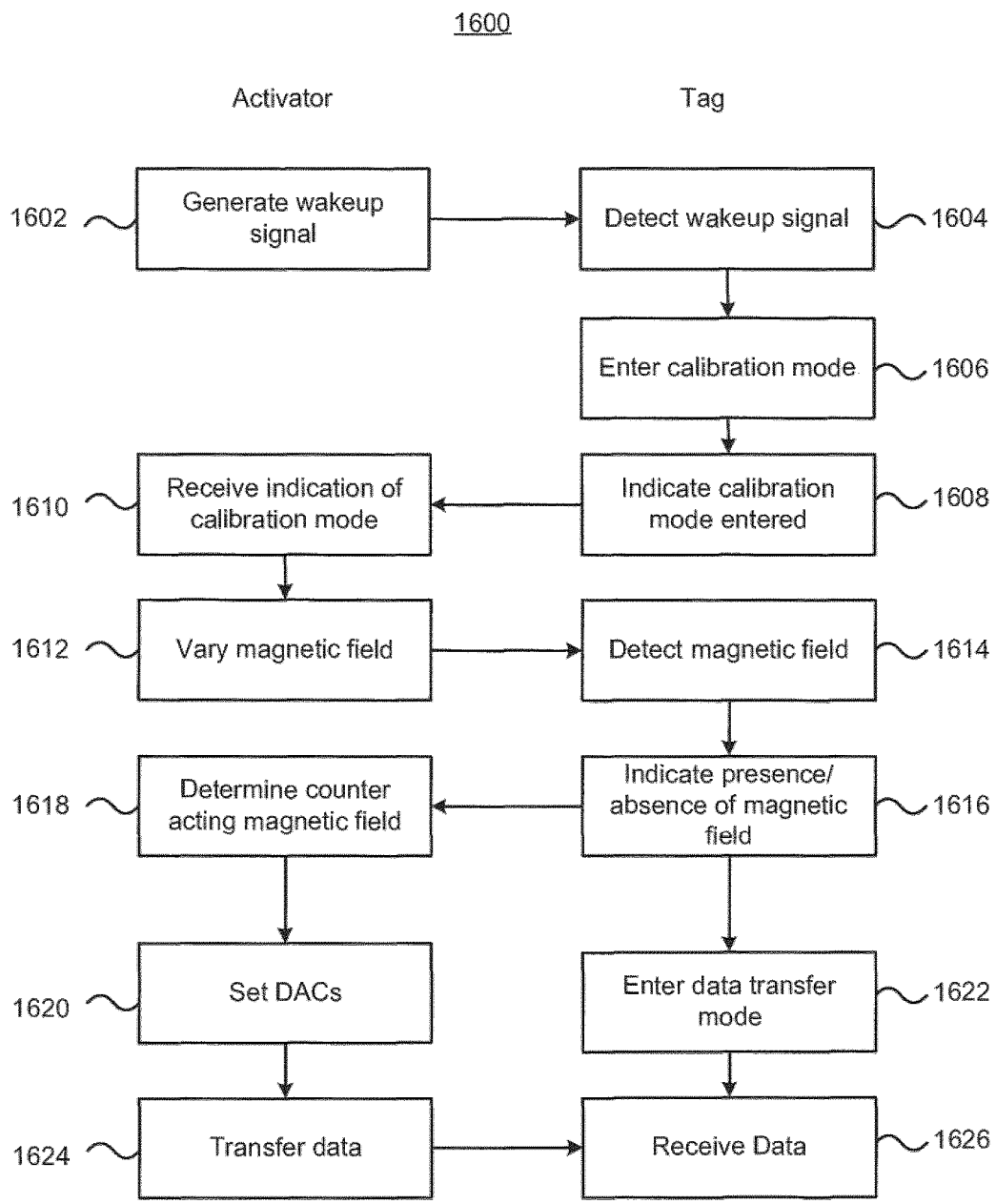
FIG. 16 depicts a method of activating a tracking tag.

FIG. 16 depicts a method of activating a tag. When a tag is inserted into the activator, the tag is placed in a calibration mode in order to determine the counter acting magnetic field. Once the calibration is performed, data can be transferred from the activator to the tag. The method begins with generating a wakeup signal (1602). The wakeup signal may be a rapidly varying magnetic field. For example a triangular 100 Hz waveform may be generated. The varying magnetic field is detected at the tag (1604). The varying magnetic field will at certain points counteract the magnet's field and as such cause a change in the detected magnetic field. In normal operation, the magnetic field will not vary quickly over time and as such, when the tag detects the varying field, the tag can enter a calibration mode (1606). The tag may indicate that it has entered into the calibration mode (1608) to the activator by sending an appropriate pulse train from the ultrasonic transducer. The activator receives the indication that the tag has entered the calibration mode (1610) and begins varying the magnetic field (1612) which is detected at the tag (1614). The tag indicates the presence or absence of a detected magnetic field (1616) to the activator. The activator determines the counter-acting magnetic field (1618) that caused the tag to detect no magnetic field and sets the DACs (1620) used to generate the magnetic fields representative of '0' and '1'. The tag enters the data transfer mode (1622) and the activator begins to transfer data (1624) which is received at the tag (1626).

Figure 17:
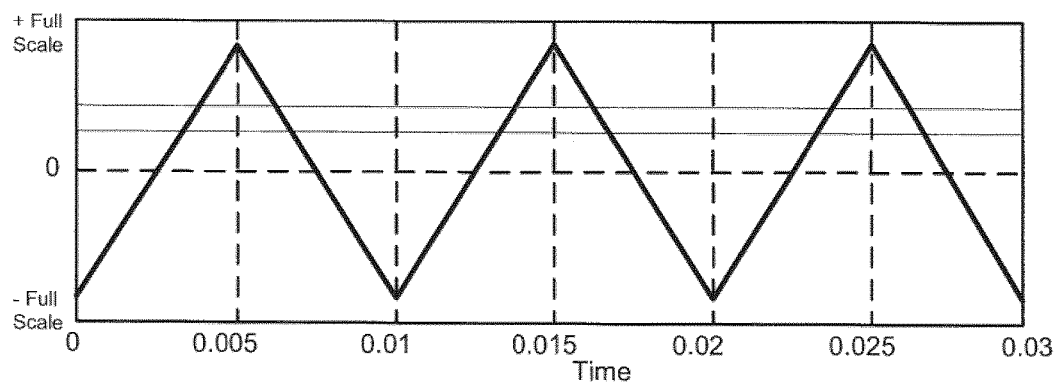
FIG. 17 depicts signals associated with activating a tag.
Figure 17:
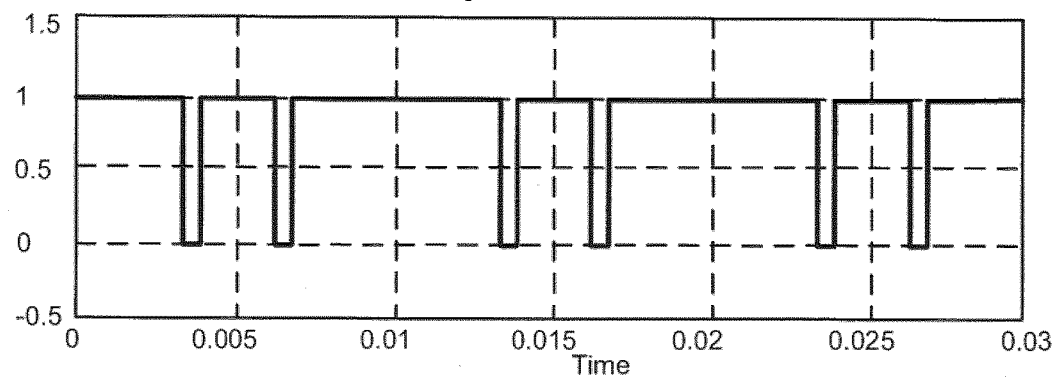

FIG. 17 depicts signals associated with activating a tag. Initially, the activator first drives the coil with a full-scale triangle wave at a frequency of 100 Hz as depicted FIG. 17. This results in a fairly distinctive "double pulse" signal from the magnetic field sensor depicted in FIG. 17. The tag detects the double pulse signal and enters the calibration mode. Detection of the waveform in the tag can be accomplished by determining if the magnetic field sensor value is different from a previous sensed value, and if it is different keep the magnetic field sensor on and observe the sensed value for the next 20 ms or more. If the magnetic field sensor values appear to be rapidly changing, the magnetic field sensor output is observed for a fixed period of time and the number of transitions in the value is counted. If the frequency is within the expected 200 Hz range (two transitions for each triangular pulse at 100 Hz) the tag enters the calibration mode. Upon detecting the varying signal, the tag pings out a distinctive sequence of pings, which are different from its usual operating transmissions, to tell the activator that it's entering calibration mode. Although depicted as a triangular waveform having a frequency of 100 Hz, it is possible for the wave form to have different frequencies or shapes. For example, the signal may have frequencies ranging from approximately 10 Hz, or less, to approximately 10 kHz or more. The frequency range of between 10 Hz and 10 kHz is only illustrative, and the frequency may be greater than 10 kHz or less than 10 Hz.

Once the tag is in the calibration mode, the activator attempts to determine the DAC setting required for counteracting the magnet's magnetic field. In the calibration mode, the tag keeps its magnetic field sensor powered on. If the magnetic field sensor detects the absence of a magnetic field, the tag will continuously ping, otherwise the tag will remain silent. For accuracy, the tag may ping immediately after the magnetic field sensor detects the absence of a magnetic field.

If the magnetic field sensor is held low for a sufficiently long and uninterrupted time, then the tag enters data transfer mode. If the magnetic field sensor does not go low for a long period of time, it is assumed that a fault occurred in the activation process and the tag may go back to regular operation.

In calibration mode, the activator may search for the "zero point", that is the DAC setting that counteracts the magnet's magnetic field at the sensor by the following method of the following pseudo code. In the following, it is assumed that 'DAC0' is the first DAC used for generating the counteracting magnetic field and that the DAC values can vary between 0 and 4095. A value of 0 corresponds to full scale negative current, 2048 to zero current, and 2095 to full scale positive current.

Start with the magnetic field at zero (DAC0=2048)
    If the tag pings, there's no magnet present—set DAC0 to 2048 and return;
Increase the DAC0 setting until:
    DAC0=4095 is reached;
    Or the tag pings;
If the tag pinged:
    Record the DAC0 setting;
    Set the DAC0 value to 4095;
    Slowly decrease the magnet field (decrement DAC0 setting) until the tag pings;
    Record the second DAC0 setting;
If DAC0 reached 4095:
    Set the magnetic field back to zero (DAC0=2048);
    Decrease the DAC0 setting until the tag pings; Record the DAC0 value;
    Set the DAC0 value to 0;
    Increase the DAC0 value until the tag pings. Record the DAC0 value;
Set the DAC0 value to the average of the two recorded values.

The activator then holds the 'DAC0' value, until the tag stops pinging. Once the counteracting magnetic field is calibrated, the tag may be placed in a data transfer mode in which the activator sets the first DAC to the 'DAC0' value calculated and sets the second DAC to a suitable value 'DAC1' that will ensure that the magnetic sensor detects a magnetic field. The value may be determined according to:
If (DAC0<2048) then DAC1=4095; (full scale positive)
Else DAC1=0 (full scale negative)

Once the DACs are set, the data can be transmitted to the tag by switching the multiplexer output to select which DAC drives the coil.

Figure 18:
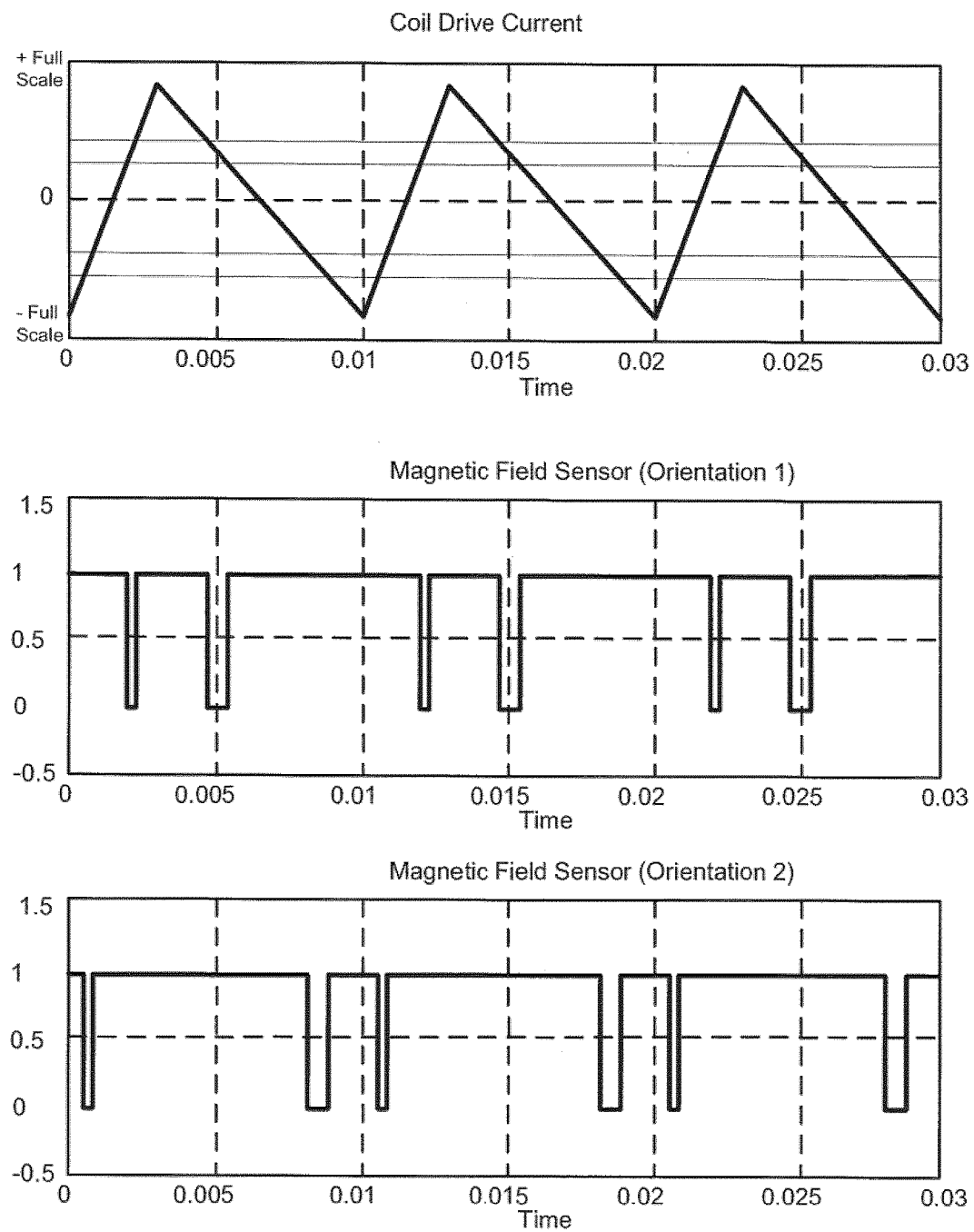
FIG. 18 depicts further signals associated with activating a tag.

FIG. 18 depicts further signals associated with activating a tag. As described further with reference to FIG. 18, it is possible to determine the DAC setting required for counteracting the magnetic field of the magnet at the tag. It is possible to combine the activation and calibration waveforms into a single step—the tag observes the waveform coming out of the magnetic field sensor, calculates a calibration value and reports the calculated value to the activator.

This method requires the magnetic field sensor to be detected with a hardware timer in the tag's microcontroller, or with fast running code on the tag's microcontroller, in order to measure time delays with reasonable accuracy. To wake up the tag, the activator applies an asymmetrical, saw-tooth waveform to the coil as depicted in FIG. 18. The coil driving signal has a rise time of approximately 3.33 ms, a fall time of approximately 6.67 ms, and a period of 10 ms (100 Hz). Although depicted as a triangular waveform having a frequency of 100 Hz, it is possible for the wave form to have different frequencies or shapes. For example, the signal may have frequencies ranging from approximately 10 Hz, or less, to approximately 10 kHz or more. The frequency range of between 10 Hz and 10 kHz is only illustrative, and the frequency may be greater than 10 kHz or less than 10 Hz. Further, the rise and fall times may vary based upon the asymmetry of the waveform.

The resulting signal coming out of the magnetic field sensor, depicted in FIG. 18 is similar to the previous "double pulse" waveform, except that the two pulses have different lengths. Whether the narrow or wide pulse comes first depends on the magnetic field polarity required to cancel the predation magnet. Once the tag determines the presence of the wakeup signal, the tag measures the following delays:

T1 Width of first pulse
T2 Width of second pulse
T12 Time delay from end of the first pulse to start of the second pulse Given these values, the tag can calculate the required calibration value with the method of the following pseudo code:

```
If (T2 > T1) {
    DACH = 4095 - (T12 * k1);
    DACL = DACH - (T2 * k2);
    DAC0 = (DACH + DACL) >> 1;
} else {
    DACL = (T12 * k1);
    DACH = DACH + (T1 * k2);
    DAC0 = (DACH + DACL) >> 1;
}
``` k1 and k2 are constants derived from the waveform frequency, waveform duty cycle and the units of measure of T1, T2 and T12.

The resulting 'DAC0' value, which may vary between 0 and 4095 for example, is pinged back to the activator using a distinct PPM sequence, different from a usual PPM ping. The tag may then enter data transfer mode.

The activator then sets its 'DAC0' value to the provided value, sets 'DAC1' to a suitable complementary value, and begins data transfer.

Figure 19:
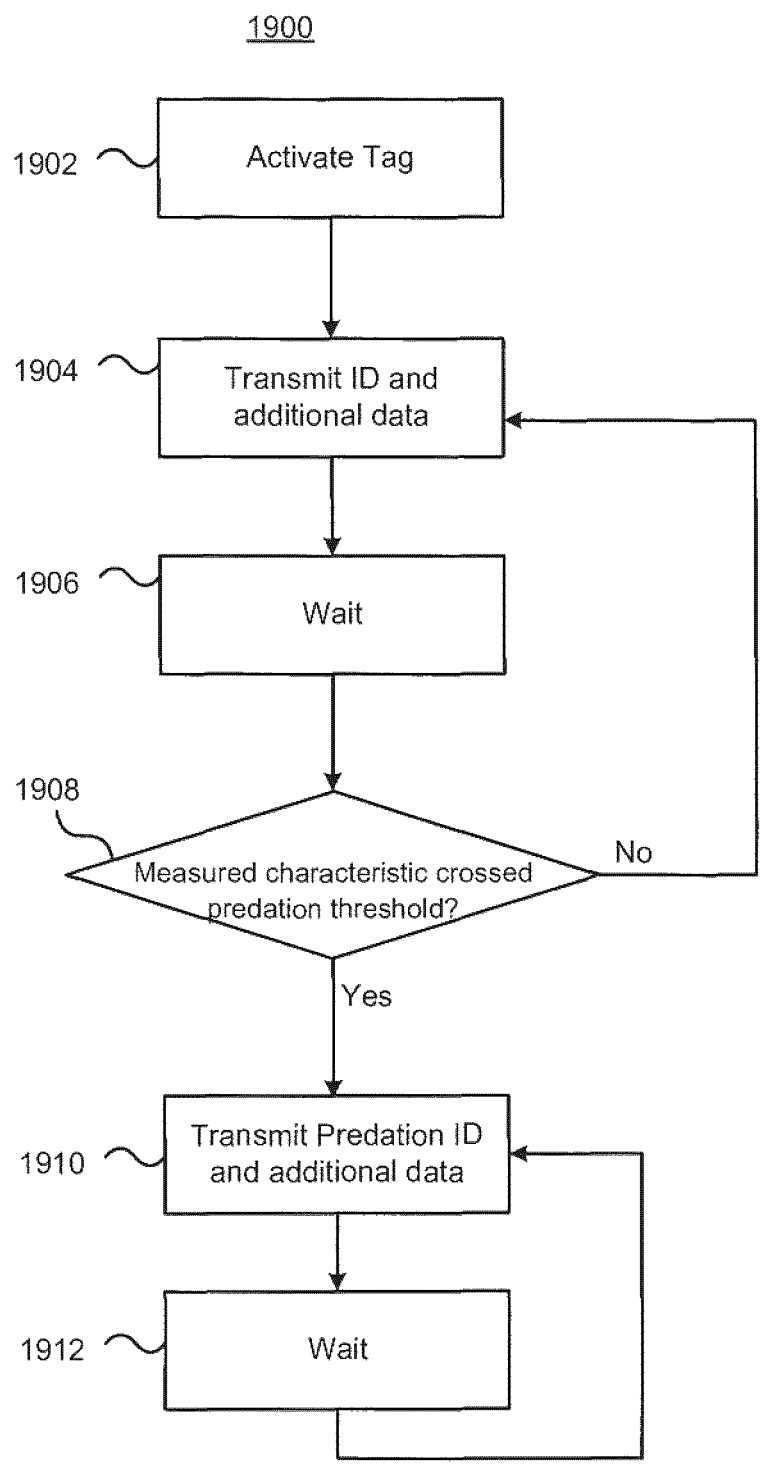
FIG. 19 depicts a method of operating a tracking tag.

FIG. 19 depicts a method of operating a tracking tag. The method 1900 begins when a tag is activated (1902) and implanted into a coelomic cavity of an animal. The animal may then be released back into the body of water, with the tag operating to periodically transmit its unique ID. The tag transmits its ID and any other additional data (1904), such as sensor information including temperature sensors, acceleration sensors or any other sensors. Once the ID has been transmitted the tag waits (1906) for a period of time. The period of time that the tag waits for may vary. However, once the wait period is over, the tag determines if a detected characteristic crossed a predation threshold (1908). The predation threshold provides an indication of detected characteristic values that are associated with the tag being in an acidic environment. If the detected value has not crossed the predation threshold (No at 1908) the tag transmits its ID and any additional data again (1904). If the detected value has crossed a predation threshold (Yes at 1908), a predation event has occurred, and as such the tag may change its operating mode. The tag may begin to transmit a predation ID (1910), which differs from the regular tag ID, in order to indicate that a predation event has been detected. The tag may also transmit additional data such as temperature readings or values from other sensors. The additional data may also include an indication of the amount of time that has elapsed since the detection of a change in the characteristic of the tag, which change is associated with the predation event. After a predation event has been detected, it is no longer necessary to check if the predation threshold has been crossed, and as such the tag may wait (1912) for a period of time before transmitting the predation ID again (1910).

The predation tags described above utilize a pH sensitive material that degrades preferably quickly in an acidic environment, but does not degrade in a neutral or basic environment. As described further, various pH sensitive materials were developed and tested for their appropriateness in use with predation tags. The pH sensitive material should be robust enough to survive months inside the body cavity of a fish where the tag is implanted, yet break down relatively rapidly once predation occurs.

Chitosan was used in creating pH sensitive material. The chitosan pH sensitive material may be formed from casting a slurry and evaporating a solvent of the slurry. Swelling and degradation properties of the chitosan can be affected by different additives such as plasticizers and cross-linkers. Results of tests done on various chitosan slurries as well as the use of the slurry on tags are set out further below.

Medium molecular weight (approximately 750,000 Daltons) chitosan were used in the preparation and testing of the pH sensitive material. The chitosan was purchased from Sigma Aldrich™. It is low cost with 88% deacetylation, as determined via NMR analysis. The chitosan can be dissolved in solution and then cast as a film or used as an adhesive. The properties of chitosan and its film can be tailored based on the degree of deacetylation, crystallinity, purity, molecular weight of the sample, pH of the environment, presence or absence of plasticizing agents, crosslinking, drying and isolation conditions, and the acid used in the solvent. Various slurries of chitosan were tested to determine the rate of degradation in simulated coelomic fluid, the degree of swelling in simulated coelomic fluid, and the time to break down in an acidic solution. It is desirable that the material be stable in the ventral body cavity of a fish yet quickly dissolve in the primitive stomach of predators.

Chitosan can be dissolved in a protic solvent to obtain a uniform slurry that can be cast as a film or utilized as an adhesive. In the case of film formation, the solvent is allowed to evaporate over a period of time. The composition of the solution, presence of additives, and evaporation conditions have all been shown to effect the properties of the resultant product.

The most influential factor on the properties of the resultant product is the choice of solvent mixture. Four acidic aqueous solutions were considered for solvation of the chitosan. The solutes included L-ascorbic acid, citric acid, acetic acid, and hydrochloric acid. The results of the solute testing are presented in Table 1.

TABLE 1

Effect of various solutes on chitosan film formation.

| Solute | Test Results |
| --- | --- |
| L-ascorbic acid | Films showed evidence of extreme decomposition over time in air. |
| Citric acid | Films showed good adhesion and toughness when wet. Films showed excess swelling when placed in water and contracted upon drying. Films were not flexible when dry. |

TABLE 1-continued

Effect of various solutes on chitosan film formation.

| Solute | Test Results |
|---|---|
| Acetic acid | Films did not adhere well.<br>Less noticeable swelling when wet.<br>Slight wrinkling of edges while drying.<br>Films maintained a good degree of flexibility when dry. |
| Hydrochloric acid | Films were brittle. Higher concentration of HCl caused hydrolysis. |

As can be seen from table 1, acetic acid and citric acid showed the most favorable results and were used for further testing. The use of a plasticizing agent can improve the characteristics of the materials cast with acetic acid as described further below. Citric acid materials did not show improved characteristics with plasticizer and as such slurries with acetic acid were focused upon.

Adhesion of films and slurry to substrate materials such as epoxy and parylene may be important to ensure that the film remains adhered to the tag. Studies of chitosan slurries with acetic acid focusing on adhesion of the film on a substrate were performed. While drying, often the film would show poor adhesion and peel up. It was found that the adhesion of the film to the substrate could be improved by sanding the surface of the substrate with 600 grit sandpaper. The sanding increased the surface area and allowed for strong adhesion, with no resulting peeling or curling at the edge of the films. All films passed a scratch and tape test once the surfaces had been sanded. A scratch test is simply scratching the surface of the film with a fingernail, while the tape test was done by adhering a one inch piece of STAPLES™ brand scotch tape and removing it quickly. A test was considered positive if the film remained intact after the test. Chitosan films were tested for their adhesion to a parylene coated surface and epoxy pucks. The chitosan showed good adhesion to the parylene. After sanding, the chitosan film showed good adhesion to the epoxy pucks. Generally, good adhesion was observed after the surface area was increased by sanding and all passed the scratch and tape tests.

The films of chitosan cast in acetic acid were flexible and strong. In order to test the swelling and degradation characteristics of the films as well as the effect of additives on the films, the films were tested in simulated coelomic fluid (SCF). The SCF was made to mimic the conditions inside the body cavity of a fish that are typical of marine fish. The SCF was composed of: 0.02 mM HEPES buffer solution (83264-500 ML, Sigma Aldrich), 124.1 mM NaCl (Sigma Aldrich), 5.1 mM KCl (Sigma Aldrich), 1.6 mM $CaCl_2 \cdot H_2O$ (Sigma Aldrich), and 1.0 mM $MgSO_4 \cdot H_2O$ (JT Baker). The pH of the solution was adjusted to 8.20 using 1 M NaOH. Solutions used in biological studies also often include dextrose and penicillin. These were omitted here as they are considered to have little influence on the ionic conductivity and degradation of the films. Also, dextrose could allow bacteria to grow on the samples during long-term studies.

The films were allowed to sit in 5 mL of the SCF for different periods of time. During these periods the solutions were agitated daily and the fluid was replaced every three days to imitate the natural replenishment of the coelomic fluid in a living fish.

Before the films were placed in the SCF they were weighed to get their initial dry mass. After allowing them to sit in the SCF for a specified amount of time they were removed from the fluid. They were patted dry and weighed immediately to get the wet mass. The films were then allowed to dry for the period of a week and then weighed again to get the dry mass after the trial. Using these three different masses (dry mass, wet mass, and dry mass after trial), the swelling and degradation of the films were quantified, as follows:

$$\% \text{ swelling} = \frac{\text{wet mass} - \text{dry mass}}{\text{dry mass}} \times 100 \quad (1)$$

$$\% \text{ degration} = \frac{\text{dry mass after trial} - \text{dry mass}}{\text{dry mass}} \times 100 \quad (2)$$

Equation (1) shows the swelling experienced by a film in the SCF while equation (2) shows the mass loss of the film, which is referred to as degradation of the same film.

A value of 100% swelling would represent a film that has doubled its mass and therefore experienced considerable swelling. It is not unusual for these thin films to take up a lot of water while in the SCF. A value of 0% swelling means that that change in mass was undetectable, but 0% swelling is not characteristic of these chitosan films. The degradation % is usually expressed as a negative, meaning that mass was lost during studies. A value of −50% degradation would signify that the film has lost half of its original mass. Typical values are around −10% degradation.

Figure 20:
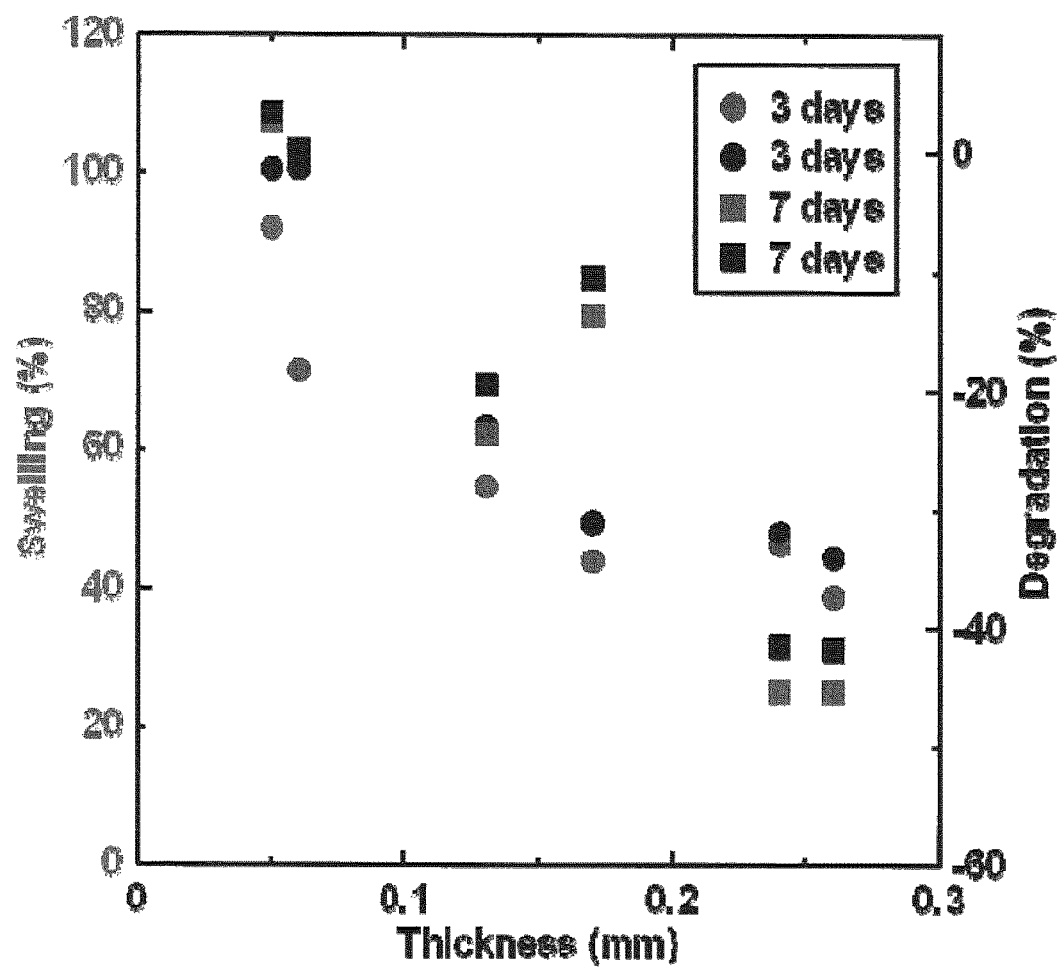
FIG. 20 shows a graph of the effect of film thickness on swelling and degradation of the films.

It was observed that the thickness of the films may drastically affect the swelling and degradation of the films, as seen in the graph of FIG. 20. Films of differing thickness, from 0.05 to 0.25 mm were placed in SCF for durations of three or seven days. The film formulation was 2% by mass of chitosan to solvent and 20% by mass of glycerol to chitosan in 0.2 M acetic acid. It was observed that as film thickness increased, the swelling and mass loss decreased.

The films prepared from pure chitosan polymer tend to be brittle and even crack upon drying. The addition of plasticizers to the film forming slurry may alleviate this problem. This addition of plasticizer may improve flexibility and possibly also the mechanical properties of the film. However, the addition of plasticizer may cause adverse effects on film properties such as increasing swelling of films in solution. When the plasticizer exceeds a certain concentration, phase separation can also occur. The amount of plasticizer used in film formation should also be small enough to avoid any non-biocompatible and toxic effects, yet large enough to increase flexibility.

Figure 21:
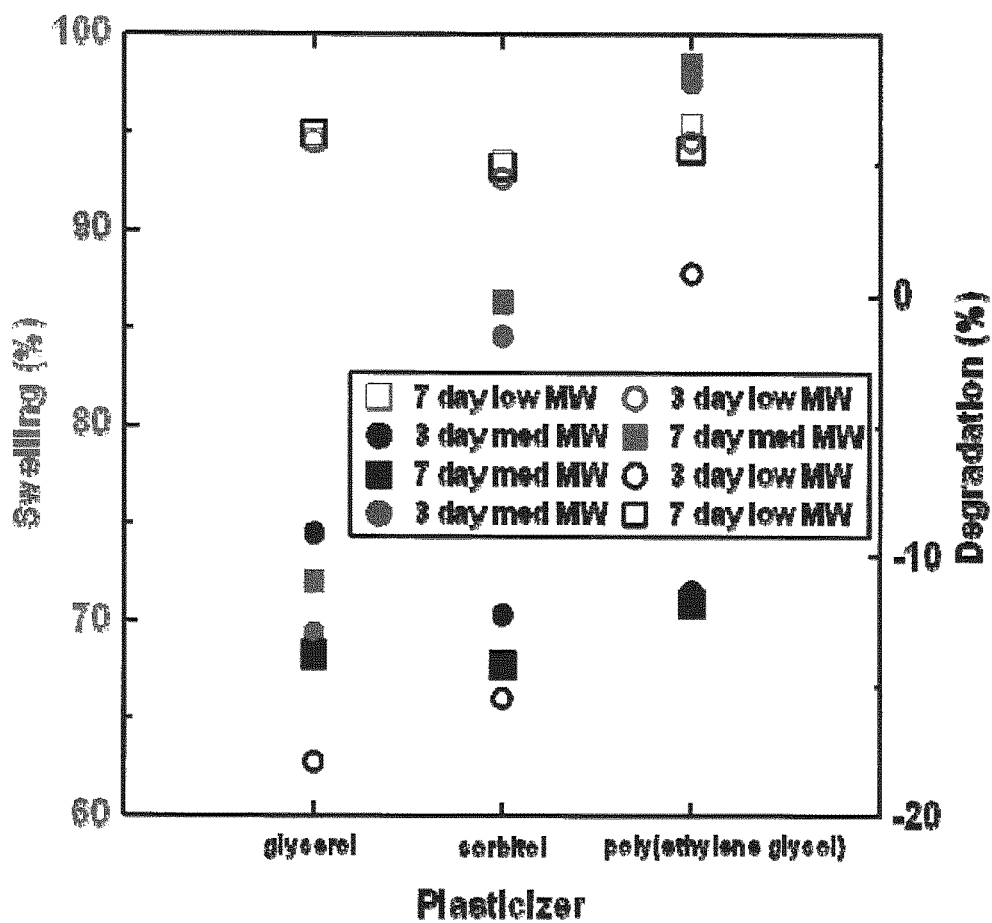
FIG. 21 shows a graph of the effect of plasticizers on swelling of the films.

Plasticizers of interest here included glycerol, ethylene glycol, poly (ethylene glycol), erythritol, oleic acid, propylene glycol, di-hydroxyl stearic acid, and sorbitol. These were selected on the basis of low cost, low toxicity, and favorable in vivo response. These are mostly polyols which may lower the glass transition temperature for the plastic, making it more flexible at the temperature at which it will be used. This means durability should increase as a result. Of these plasticizers, glycerol, sorbitol, and poly (ethylene glycol) are readily available and low cost. Tests were done on films cast with these three plasticizers and results are shown in FIG. 21.

Two forms of chitosan were used for this plasticizer test: medium and low molecular weight chitosan polymers. Each of these chitosans was tested with the three plasticizers. An amount of 20% by mass of each plasticizer to chitosan was added to the chitosan slurry for testing. The low molecular weight chitosan displayed similar results for all plasticizers in terms of swelling (tested at 7 days and 3 days), and degradation (tested at 7 days). However, medium molecular weight chitosan was more tunable with the different plasticizers. Glycerol samples showed less swelling compared to those with sorbitol and poly (ethylene glycol). Degradation was about the same for all plasticizers using medium molecular weight chitosan.

Figure 22:
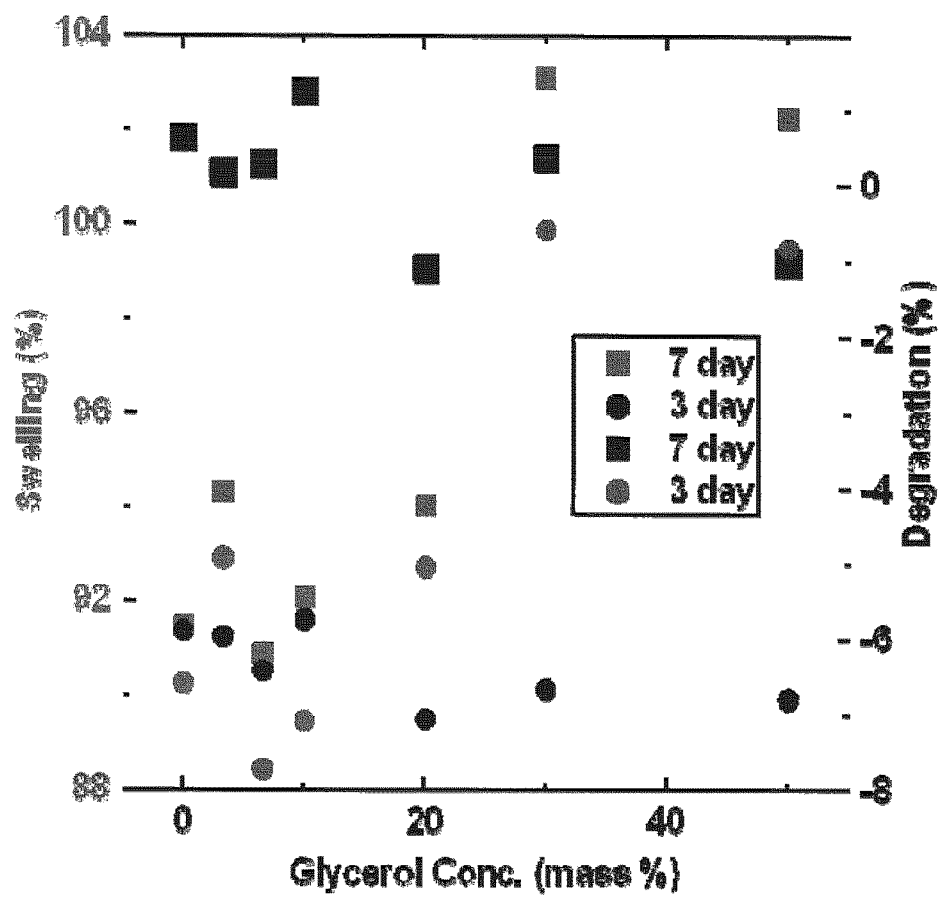
FIG. 22 shows a graph of the effect of concentration of glycerol to chitosan on swelling.

From the above, glycerol plasticizer gives the chitosan films the most favorable characteristics and was used for further testing. The influence of the amount of glycerol plasticizer in the chitosan slurry was also tested. FIG. 22 shows the influence of concentration, by weight percent, of glycerol to chitosan on swelling and degradation.

The greater the concentration of glycerol, the more swelling the films experience in SCF. Higher glycerol concentrations also lead to greater degradation. There is an apparent boundary in the glycerol concentration above which the swelling jumps to much higher values. This boundary is between 20 and 30 mass percent glycerol. The data indicates that only a small amount of glycerol is needed to produce the desired film properties. Accordingly, using 3%-20% by mass of glycerol to chitosan when forming the pH sensitive material may provide desirably low swelling, while still maintaining the film's plasticity and flexibility.

In addition to the plasticizer, the chitosan film may include cross-linkers. The use of cross-linkers serves to provide bridges or bonds between the chains of a polymer to link them together. These bonds can be either covalent or ionic. Cross-linking agents have the ability to improve film density and decrease the water absorption upon wetting in SCF, giving less swelling of the films as well as less degradation. Cross-linking also causes flexibility to decrease and hardness to increase. Overall the added interactions can strengthen the chitosan film. The polymer chitosan can be cross-linked with such compounds as sodium citrate, sodium sulfate, and calcium chloride. To cross-link, the films were simply allowed to soak in the cross-linking solution (a certain mass % of cross-linker mixed in water) for a fixed period of time, after which they were rinsed with copious amounts of distilled water to neutralize them. Sodium hydroxide was included in the slurries as it serves to basify the films which are acidic because of the acetic acid used in the formulation; however, the sodium hydroxide does not participate in the cross-linking step and induces no cross-linking. Sodium citrate and sodium sulfate both provide polyvalent anions which bind the chitosan chains to cross-link them ionically. All films were cross-linked for a period of two hours unless otherwise specified. After cross-linking the films were allowed to dry prior to further testing.

Figure 23:
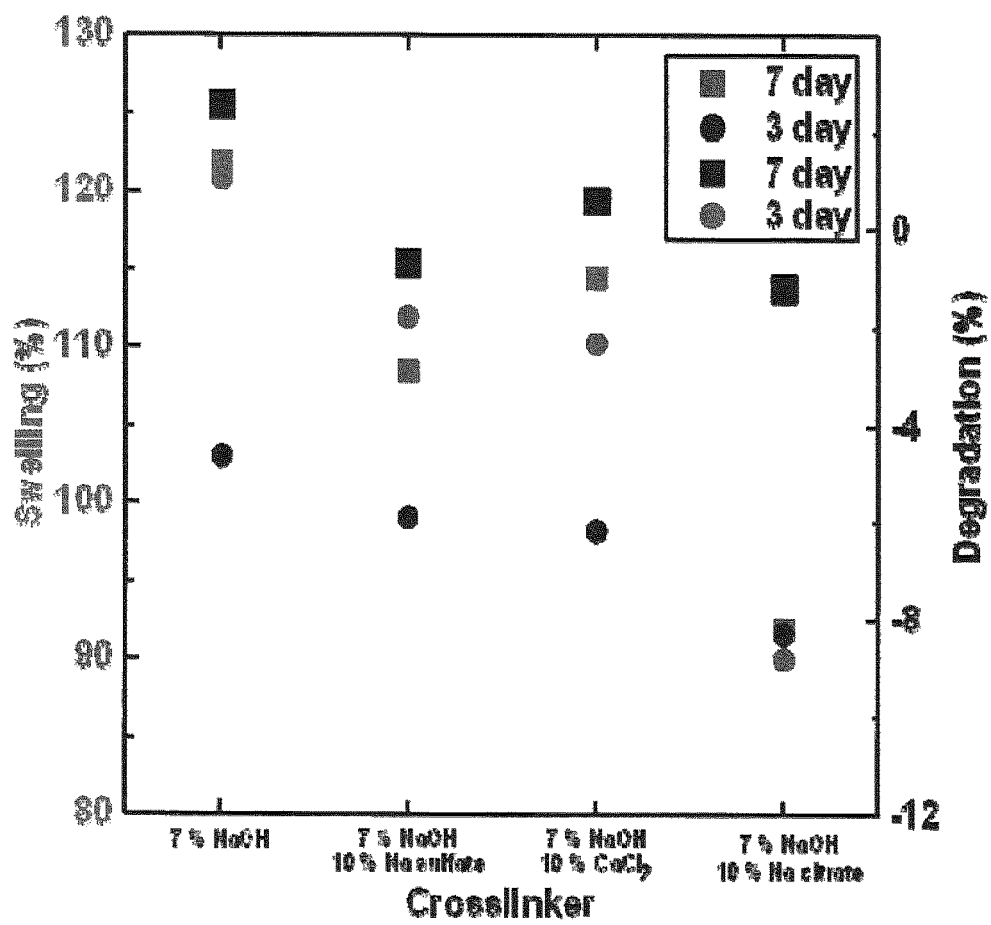
FIG. 23 shows a graph of the effect of cross-linkers on the swelling and degradation of films.

FIG. 23 shows the swelling and degradation results of films cast using 2 mass % chitosan in the slurry and 20 mass % glycerol to chitosan in 0.2 M acetic acid solvent and then treated with different cross-linkers for two hours with a specified mass % of cross-linker. Swelling was decreased when sodium citrate was used as a cross-linker compared to the others, while the control of just NaOH and no cross-linker displayed the most swelling. The degradation was not as strongly influenced by cross-linking, as all degradation values were relatively low.

Figure 24:
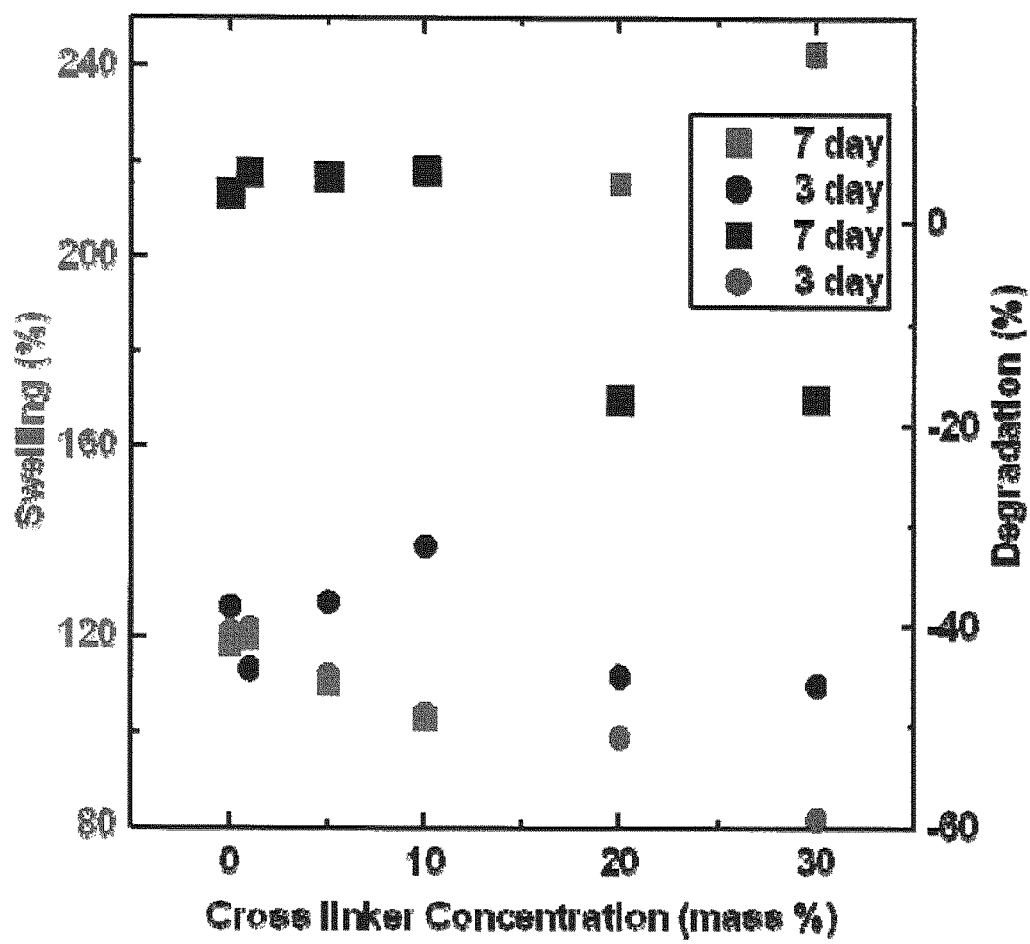
FIG. 24 shows a graph of the effect of sodium citrate concentration on swelling and degradation.

The cross-linker concentration was also tested to see its effect on the film swelling and degradation. For this test the sodium citrate, which provided low swelling and degradation, was used. A standard 7 mass % of NaOH was used along with differing concentrations of sodium citrate. Films were cast from 2 mass % chitosan in the slurry and 20 mass % glycerol to chitosan in acetic acid and water solvent. FIG. 24 shows the film swelling and degradation when changing the sodium citrate concentration from 0 to 30 mass %. Swelling at 3 days decreased as the amount of sodium citrate cross-linker was increased. The degradation did not show a regular pattern after either 3 days or 7 days, but was near zero at low concentrations after 7 days. A desirable sodium citrate concentration for cross-linking was approximately 10 mass % relative to chitosan.

Figure 25:
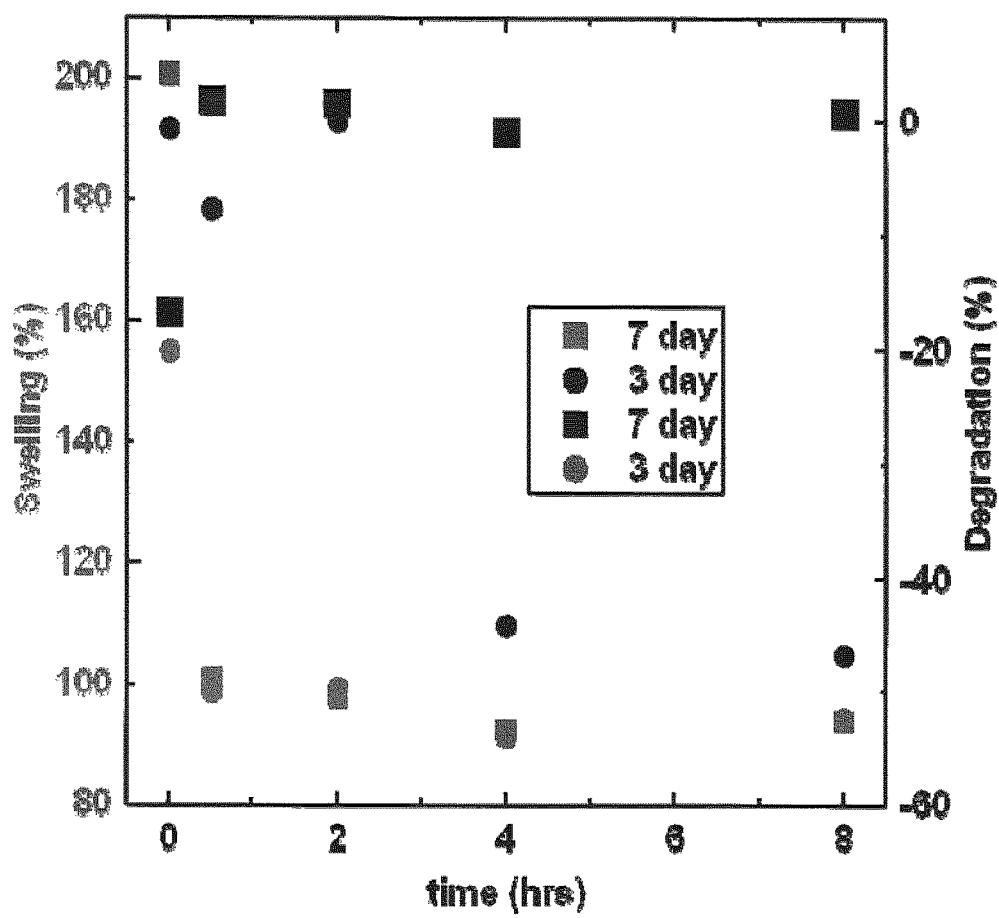
FIG. 25 shows a graph of the effect of cross-linking time on film swelling and degradation.

Another study was carried out to determine the influence cross-linking time on film swelling and degradation. The data from this study are shown in FIG. 25. The cross-linking time was varied from 0 (quick rinse) to 8 hours. Swelling was greatest for the low cross-linking times and degradation was not influenced much by the cross-linking time. A shorter cross-linking time is more desirable in terms of production. Accordingly, 30 minutes of cross-linking may provide favorable film characteristics, namely, reduced swelling and reduced degradation while providing an acceptable production time.

Overall, cross-linking is a desirable step in the formation of a chitosan film. The cross-linking with sodium citrate reduces swelling and minimizes degradation. Soaking for a half hour in 10 mass % sodium citrate relative to chitosan is sufficient to provide the desirable properties.

Figure 26:
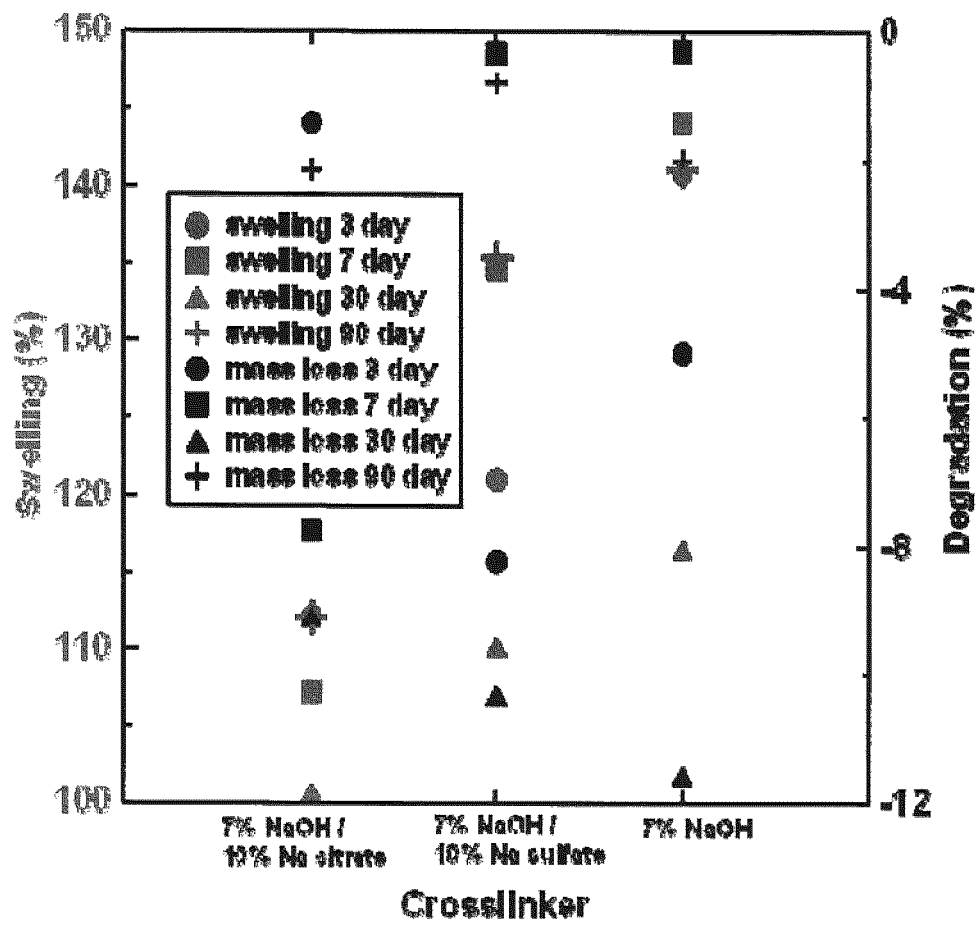
FIG. 26 shows a graph of the effect of additives on the long-term stability of the films.

Long-term degradation studies were carried out to evaluate the use of the additives described. The goals were to provide stability of the chitosan for months in the SCF, yet rapid degradation in the low pH of the fish gut. The long-term study looked at stability of the films immersed in the SCF for periods of time up to 90 days. Chitosan films were cast with 2 mass % medium molecular weight chitosan and 20 mass % glycerol to chitosan in acetic acid and water solvent for these tests. Several cross-linkers were used for this long-term study and FIG. 26 shows the results.

All of the films stood up to the SCF for the extended period of 90 days. Swelling was least in the sodium citrate cross-linked film after the 30 days (101%), while the film in the SCF for 90 days and cross-linked with sodium citrate swelled approximately 112%. The degradation in the sodium citrate cross-linked film after the 90 days was about −2%. Overall the films displayed good long-term stability in the SCF.

Accelerated aging studies were done on a medium molecular weight chitosan film with glycerol cast from an acetic acid and water solution. The accelerated aging was done by placing 1×1 cm squares of the film in a 65° C. oven for 0, 2, 5, and 24 hours. Results from the accelerated aging studies can be seen in FIG. 27.

As the films were heated to simulate aging they slightly discolored, turning from almost colorless to a yellow color and curling around the edges. This was also characteristic of films that were not subjected to accelerated aging, i.e., films left on the bench for several months, indicating that the accelerated aging method was reliable as a pseudo-aging procedure. Extreme discoloring was seen above 65° C. The studies also showed a film that turned brown as it is heated up to temperatures as high as 100° C.

Figure 27:
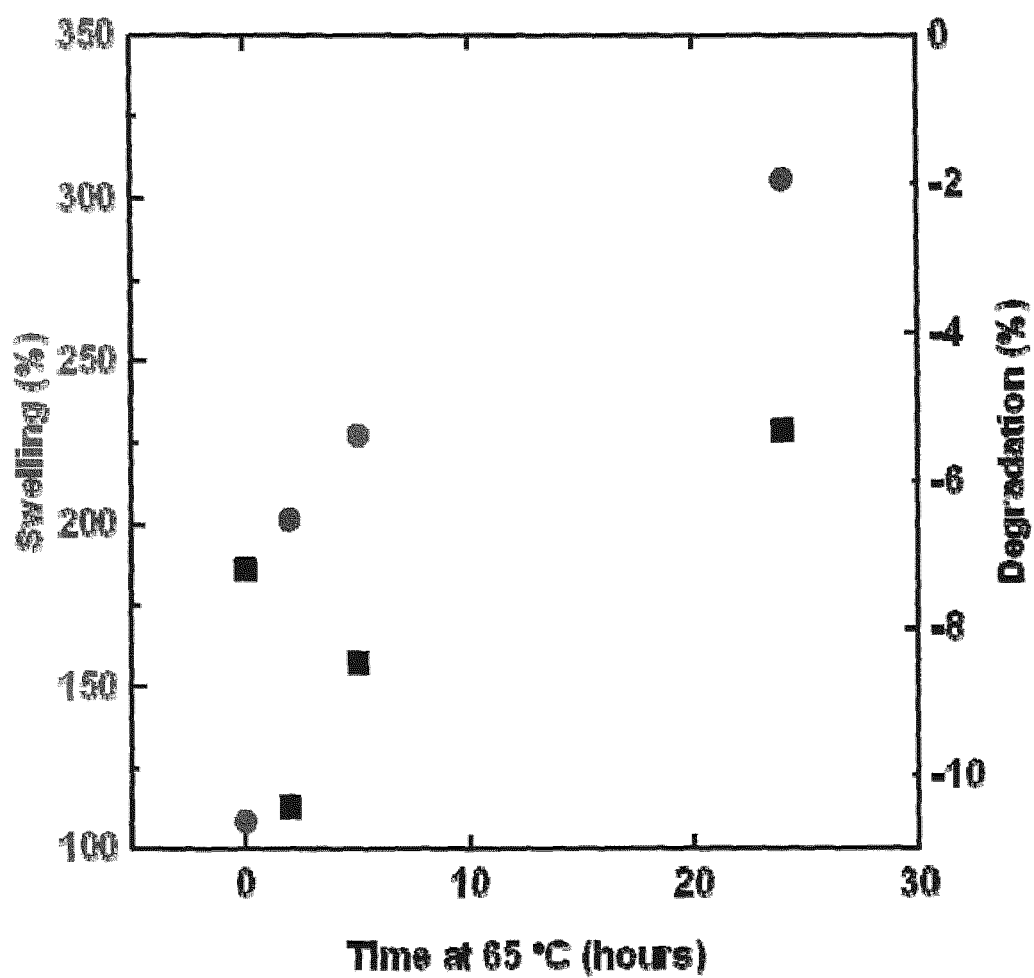
FIG. 27 shows a graph of the effect of accelerated aging on the films.

After the films were heated to accelerate the aging process, they were tested in SCF and then an HCl acidic solution for degradation and swelling characteristics. FIG. 27 shows the swelling and degradation of the films after being immersed in SCF for 24 hours.

The accelerated aging tests showed that the films that were treated at elevated temperatures for extended periods of time experienced increased swelling. This may be attributed to a breakdown of the polymer structure, which in the case of 24 hours at 65° C. leads to extreme 300% swelling. The degradation of the accelerated aging films does not appear to be altered with the aging process, as all films still degrade as much as others tested. It is noted that the relation between treating a film at 65° C. for 10 hours and normal film aging is not clear; however, tests in an HCl solution to simulate a predation event show that the longer the film was subjected to elevated temperatures, the faster it degraded. All of the films degraded within two hours, however the film treated for 24 hours at 65° C. degraded in an hour. Therefore, aging does not appear to adversely influence the use of these films for pH-dependent degradation.

Based on the studies that were performed, a possible formulation for a chitosan slurry with additives suitable for use as a pH sensitive material in a predation tag may be summarized as follows. A plasticizer such as glycerol can be added in concentrations from 3% to 20% mass relative to chitosan. At this concentration the film gains flexibility while avoiding extreme swelling that is characteristic of higher concentrations of plasticizer. Cross-linking may be done with sodium citrate, as it decreases swelling and degradation compared to other cross-linkers. The concentration of sodium citrate that increases the strength of the chitosan film while lowering degradation was between 5% and 30% by mass of cross-linking solution. The time for cross-linking had little effect on the properties of the film compared to the cross-linker concentrations, thus a half hour was sufficient.

The above formulation may be well suited for casting a film over exposed electrodes; however, it was too runny to adhere a magnet to a tag. The maximum concentration of chitosan in a slurry that could be stirred with a magnetic stir bar was 2 mass %. In order to increase the chitosan concentration, the slurry had to be mixed by hand. Concentrations as high as 10 mass % could be achieved when mixing by hand. Slurries with chitosan concentrations from 2 to 10 mass % were tested.

The stirred slurries had trapped air bubbles and were allowed to sit and degas overnight. The 8 and 10 mass % chitosan slurries were more like a paste. All except the 2 mass % chitosan slurry still had gas bubbles remaining after 24 hours of sitting. The 4 mass % chitosan took several days to degas, which may be too long for production. Above 4 mass % there were uniformity issues (clumpy), even though the chitosan did go into solution. The 2 mass % solution degassed quickly and was uniform but it was not viscous enough while 4 mass % was viscous enough and uniform but degassed too slowly. A slurry with 3 mass % chitosan proved acceptable for adhering a magnet to the tag. The 3 mass % slurry was viscous enough, uniform, and degassed overnight. This 3 mass % chitosan slurry was placed drop wise on the tags with a paperclip piece (approx. 5 mm in length). The paperclip piece was used to mimic the eventual small rare earth magnet and was situated in a small well on the tag as depicted in FIGS. 8A-8C. The 3 mass % chitosan slurry beaded overtop the paperclip piece and provided an effective adhesive. After the slurry was allowed to dry it formed a thin film protecting the paperclip contained in the well.

A 300 mL batch of the 3 mass % slurry may be made with 9 g of the medium molecular weight chitosan (3 mass %) suspended in 150 mL of distilled water. Once suspended, 150 mL of the 0.4 M acetic acid solution may added. This two-step process prevents clumping of the chitosan. The solution may then be stirred by hand with a stirring rod. Next, 0.9 g (27 drops) of glycerol (10 mass % to chitosan) may be added drop wise while stirring once again with a glass stir rod. The slurry may then be allowed to sit overnight so that any bubbles that may have formed can escape (degassing).

The amount of slurry to be applied to the tags may be determined experimentally. Application of the slurry was found to be easiest if done by dripping a single drop onto a tag and then adding each additional drop one at a time with a drying step in between. Eight tags with dried films were tested in SCF overnight and then degraded in an HCl solution. There were two tags each with 1, 2, 3, or 4 drops of slurry. Multiple drops were applied by letting the prior drop dry before adding another. One of each of the 1, 2, 3, and 4 drop tags was cross-linked using 7% NaOH/10% sodium citrate by allowing them to soak in the cross-linking solution for two hours. The cross-linking solution was made by dissolving 7 g NaOH pellets and 10 g sodium citrate in 100 mL distilled water. Once the two hours passed, the tags were removed and rinsed with copious amounts of distilled water until the diluent was neutral, as tested with pH paper. The tags were then placed in SCF overnight. Tags with more than two drops showed excessive swelling in the SCF.

After the tags sat in the SCF overnight, they were placed in weakly acidic HCl solution (pH~3) to test the time for degradation. The adhesive was determined to be degraded when the adhered paperclip piece fell from its well. The tags were checked every half hour by shaking the vial they were contained in. Table 2 shows the time it took for degradation of the adhesive according to the number of drops applied and whether it was cross-linked.

TABLE 2

Hours to degrade chitosan adhesive on different tags.

| Number of drops of slurry | Cross-link | Time to degrade (hours) |
|---|---|---|
| 1 | No | 2.5 |
| 1 | Yes | 3 |
| 2 | No | 5 |
| 2 | Yes | 6 |
| 3 | No | 7 |
| 3 | Yes | 8 |
| 4 | No | 11 |
| 4 | Yes | 12 |

The adhesive always degraded on the order of hours. As expected, the more drops of slurry on the tag, the longer degradation took. The results also show that the cross-linking step usually added an extra hour to the degradation time. It is desirable that the chitosan degrade relatively rapidly in the low pH of the fish gut. Digestion can take from a couple of hours to a day or so in fish. One or two drops of medium molecular weight chitosan slurry with a cross-linking step would be sufficient in order to keep the degradation time around six hours or less. It should be noted that in a fish gut the tags would be subjected to harsher treatment in terms of churning action and a lower pH.

Several small tags using rare earth magnets measuring approximately 1 mm×0.5 mm were tested. In the tag tested, a battery was in close proximity to where the magnet was adhered. As a result, the magnet was attracted to the metal components of the battery, making adhesion difficult. The magnet had to be held in place while the chitosan adhesive dried in order for the magnet to remain in the correct position and not jump to the battery. For this to occur, only a small drop of slurry was initially applied beneath the magnet while a plastic piece not touching the adhesive, such as tweezers, held the magnet. The chitosan adhesive dried to give an initial bond between the magnet and tag sufficient to prevent the magnet from jumping to the metal components of the battery. After drying was complete, the plastic piece could be removed and a second drop of chitosan adhesive could be applied to coat the rest of the magnet and provide protection and robustness to the magnet and tag once implanted. The second drop could be from the same slurry or a different one, meaning the concentration of chitosan in the two drops can be different, such as 2, 3 or 4 mass %, as it has relatively little effect on the properties of the final product.

Tags with the small rare earth magnets adhered as described were tested in SCF. The devices were tested for a period of seven days of immersion in SCF and the magnet remained in place during this time period, although some swelling of the adhesive was apparent to the naked eye. After being in the SCF, the tags were transferred to an HCl solution that simulated a predation event. The adhesive quickly degraded, within a half hour, and the magnet fell from its place, usually jumping to the battery close-by. This degradation was much quicker than the regular tags that were tested using a paperclip which may be attributed to the attractive force between the rare earth magnet and the magnetic components of the battery nearby. The paperclip, in contrast, would fall out of its place due to gravity.

The chitosan slurry described above may shrink during the drying process. Depending upon how the chitosan slurry is used, for example as an adhesive, the shrinking may not present a challenge. However, in other uses, such as for forming a plug or filling a cavity within the tag body, such shrinking may be undesirable or problematic.

The shrinkage may be controlled or mitigated by the addition of a solid filler material. The solid filler material may be microspheres although other filler material, alone or in combination may be used. In testing of the shrinkage of the chitosan slurry with solid filler material, 3M™ brand K37 glass microspheres were used. K37 glass microspheres are a commercially available powdered filler that is lightweight and chemically non-reactive. The filler occupies most of the space, while the chitosan acts as a pH sensitive binder to hold the filler particles together until the tag enters the acidic environment of the predator's stomach. At this point the chitosan degrades allowing the composite material to disintegrate.

The dried chitosan/microspheres composite can be relatively easily crushed. This may be beneficially exploited in the magnetic tags described above with reference to FIGS. 9, 10 and 11, since a depression can easily be formed in the dried material by pressing a tool into the surface. The shape of the depression may correspond to the shape of a magnet. The magnet can be inserted into the depression in order to secure the magnet in place. The depression within the pH sensitive material may provide a degradable physical barrier that prevents or at least resists movement of the magnet while the pH sensitive material remains intact or non-degraded.

A range of concentrations of filler were tested to determine the resulting shrinkage rate and other effects on the material properties. In table 3 below the "Volume % Filler" is the volume of 3M™ brand K37 glass microspheres as a percentage of the volume of the chitosan slurry after diluting the slurry 1:1 with water to facilitate processing. "Volume % Shrinkage" is the percentage reduction in volume after drying.

TABLE 3

Table showing Volume % shrinkage of Chitosan slurry with varying amounts of filler

| Volume % Filler | Volume % Shrinkage |
| --- | --- |
| 27.7% | 56% |
| 55.5% | 18% |
| 83.2% | Approximately 0% |
| 111% | Approximately 0% |
| 139% | Approximately 0% |
| 166% | Approximately 0% |

The more filler that was added, the more viscous the wet mixture became. The addition of 83.2-111% glass microspheres substantially eliminated shrinkage upon drying and resulted in a wet mixture with a viscosity that was easily dispensed. The rate of degradation of the dried composite material in an acid environment was not substantially affected, nor was its survival in a neutral or basic environment. With the addition of 166% microspheres the mixture was so viscous it was difficult to dispense, and was brittle and crumbly when dry.

Various predation tags have been described above that utilize a pH sensitive material in order to provide a measurable change when the tag is in an acidic environment. A chitosan slurry formulation has been described, which may be useful as the pH sensitive material. The slurry may be used in adhering rare earth magnets on fish tags as a way to detect predation events, or for coating electrodes or other sensors.

Although specific embodiments of predation tags have been described, along with various formulations for pH sensitive material that is suited for use with the predation tag, other embodiments may be provided that change a measurable characteristic when in the presence of an acidic environment. The change in the characteristic can be detected by the tag and used to adjust the operation of the tag in order to indicate that a predation event was detected. It will be appreciated by those skilled in the art that other forms, arrangements or configurations of tags, sensors and related materials may be employed to provide an indication as to whether an animal being tracked was eaten by a predator.

What is claimed is:

1. A tag for tracking an animal comprising:
a first magnet at least partially encased in a pH sensitive material exposed to an external environment of the tag, the pH sensitive material degrading in the presence of an acidic environment;
a sensor for detecting a magnetic field;
a magnetic attractor providing a force to induce a change in the magnetic field detectable by the sensor upon release of the first magnet as a result of at, least partial degradation of the pH sensitive material; and
circuitry for providing a predation event trigger based upon the change in the magnetic field detectable by the sensor.

2. The tag of claim 1, wherein the magnetic attractor comprises a second magnet.

3. The tag of claim 2, wherein the second magnet is permanently affixed to the tag.

4. The tag of claim 3, wherein the second magnet causes the first magnet to move relative to the sensor when the pH sensitive material is sufficiently degraded to release the first magnet.

5. The tag of claim 4, wherein the second magnet is arranged with its magnetic field perpendicular to the magnetic field of the first magnet when the first magnet is at least partially encased in a pH sensitive material, and the second magnet causes the first magnet to rotate when the pH sensitive material is sufficiently degraded to release the first magnet.

6. The tag of claim 5, wherein the sensor is capable of detecting an orientation of a magnetic field, a change in the orientation of the magnetic field, a magnitude of the magnetic field, a change in the magnitude of the magnetic field or a combination thereof.

7. The tag of claim 6, wherein the second magnet is arranged with its magnetic field perpendicular to a particular axis of the sensor.

8. The tag of claim 7, wherein the sensor is sensitive to the magnetic field of the first magnet when it is oriented parallel with the particular axis of the sensor, and insensitive to the magnetic field of the first magnet that is oriented perpendicular to the particular axis of the sensor.

9. The tag of claim 2, wherein the second magnet attracts the first magnet out of a detection range of the sensor when the pH sensitive material is sufficiently degraded to release the first magnet.

10. The tag of claim 2, wherein the first magnet and the second magnet are secured or located against or adjacent to each other by the pH sensitive material with their respective magnetic fields aligned such that their respective magnetic fields add together constructively, wherein the first magnet and the second magnet tend to rotate or move relative to each other when released from the pH sensitive material such that their respective magnetic fields add destructively when moved or rotated.

11. The tag of claim 9, wherein the sensor is capable of detecting a strength of the magnetic fields or a change in the strength of the magnetic fields.

12. The tag of claim 1, wherein the magnetic attractor comprises an un-magnetized ferromagnetic material permanently affixed to the tag.

13. The tag of claim 12, wherein the magnetic attractor attracts the first magnet out of a detection range of the sensor when the pH sensitive material is sufficiently degraded to release the first magnet.

14. The tag of claim 1, wherein the first magnet comprises a degradable magnet.

15. The tag of claim 14, wherein the degradable magnet comprises particles of ferromagnetic material bonded together by the pH sensitive material, the particles of the ferromagnetic material being magnetized subsequent to bonding together to impart a net magnetic field to the degradable magnet.

16. The tag of claim 15, wherein the degradable magnet releases the magnetized particles of magnetic material when the pH sensitive material is degraded resulting in a reduced net magnetic field.

17. The tag of claim 1, wherein the acidic environment is a gut of a predator animal.

18. The tag of claim 1, wherein the pH sensitive material does not degrade substantially in a neutral or basic environment.

19. The tag of claim 18, wherein the neutral or basic environment is a coelomic cavity of the animal.

20. The tag of claim 1, wherein the first magnet is affixed to the tag by using the pH sensitive material as an adhesive to affix the first magnet to the tag.

21. The tag of claim 1, wherein the first magnet is at least partially encased in the pH sensitive material to form a plug that is affixed to the tag using an adhesive.

22. The tag of claim 1, wherein the first magnet is at least partially encased in the pH sensitive material to form a plug that is mechanically retained by at least a portion of a body of the tag.

23. The tag of claim 1, wherein the pH sensitive material comprises a chitosan.

24. The tag of claim 23, wherein the pH sensitive material is cast from a slurry of the chitosan and a solvent.

25. The tag of claim 24, wherein the solvent is selected from:
L-ascorbic acid;
citric acid;
acetic acid; and
hydrochloric acid.

26. The tag of claim 24, wherein the solvent is citric acid.

27. The tag of claim 24, wherein the solvent is acetic acid.

28. The tag of claim 23, wherein the pH sensitive material comprises a film having a thickness of at least 0.05 mm.

29. The tag of claim 23, wherein the pH sensitive material comprises a film having a thickness of at least 0.20 mm.

30. The tag of claim 23, wherein the pH sensitive material comprises a plasticizing agent.

31. The tag of claim 30, wherein the plasticizing agent is selected from:
glycerol;
ethylene glycol;
poly ethylene glycol;
erythritol;
oleic acid;
propylene glycol;
di-hydroxyl stearic acid; and
sorbitol.

32. The tag of claim 31, wherein the plasticizing agent is glycerol.

33. The tag of claim 23, wherein the pH sensitive material is treated with a cross-linking agent.

34. The tag of claim 33, wherein the cross-linking agent is selected from:
sodium citrate;
sodium sulfate; and
calcium chloride.

35. The tag of claim 23, wherein the pH sensitive material comprises a filler material to control shrinkage of the pH sensitive material.

36. The tag of claim 35, wherein the filler material comprises microspheres.

37. The tag of claim 36, wherein the microspheres comprise glass microspheres.

38. The tag of claim 35, wherein the filler material is present in an amount of between 50% and 150% by volume of the pH sensitive material prior to drying.

39. The tag of claim 38, wherein the amount of filler material present is between 83% and 111% by volume of the pH sensitive material prior to drying.

40. The tag of claim 1, further comprising a microprocessor for controlling one or more functions of the tag based upon the predation event trigger.

41. The tag of claim 40, wherein the circuitry for providing the predation event trigger is provided by the microprocessor.

42. The tag of claim 40, wherein the microprocessor operates in at least one of a first mode or a second mode based on the predation event trigger.

43. The tag of claim 42, wherein the microprocessor switches from operating in the first mode to operating in the second mode based on the predation event trigger.

44. The tag of claim 40, wherein the microprocessor logs information related to the predation event trigger.

45. The tag of claim 44, wherein the microprocessor logs information to non-volatile memory of the tag.

46. The tag of claim 44, wherein the microprocessor maintains a measure of elapsed time since the predation event trigger, and wherein the logged information comprises the elapsed time since the predation event trigger event.

47. The tag of claim 40, further comprising a transmitter for transmitting information related to the predation event trigger.

48. The tag of claim 47, wherein the transmitter comprises an acoustic transducer.

49. The tag of claim 47, wherein the transmitter comprises a radio frequency (RF) transmitter.

50. The tag of claim 49, wherein the RF transmitter comprises an active RF transmitter.

51. The tag of claim 49, wherein the RF transmitter comprises a passive RF transmitter.

52. The tag of claim 51, wherein the passive RF transmitter comprises an RFID transmitter.

53. The tag of claim 47, wherein the microprocessor maintains a measure of elapsed time since the predation event trigger, and wherein the transmitted information comprises the elapsed time since the predation event trigger event.

54. The tag of claim 53, wherein the measure of elapsed time transmitted by the transmitter is encoded in non-linear fashion.

55. The tag of claim 40, wherein the microprocessor operates in at least a configuration mode for transferring data to the tag to configure operation of the microprocessor.

56. The tag of claim 55, wherein a varying magnetic field is used for transferring data to the tag when the microprocessor is in the configuration mode.

57. The tag of claim 56, wherein the microprocessor further operates in at least a calibration mode for determining a value for a compensation magnetic field to allow detecting of the varying magnetic field used for transferring data in the presence of a constant magnetic field of at least the first magnet.

58. The tag of claim 57, wherein the microprocessor calculates the value for the compensation magnetic field and transmits the calculated value for the compensation magnetic field to an activation device.

59. The tag of claim 57, wherein the tag transmits an indication of a detected magnetic field in order to allow an activation device to calculate the value for the compensation magnetic field.

60. The tag of claim 1, wherein the animal is an aquatic animal.

* * * * *